US012757238B2

United States Patent
(12) United States Patent
Eistein et al.

(10) Patent No.: US 12,757,238 B2
(45) Date of Patent: Oct. 6, 2026

(54) TECHNIQUES FOR RANK-AWARE INTERFERENCE REJECTION BASED ON NEIGHBOR CELL LAYER NOTIFICATION

(71) Applicant: QUALCOMM Incorporated, San Diego, CA (US)

(72) Inventors: Yaniv Eistein, Tel Aviv (IL); Ronen Shaked, Kfar Saba (IL); Aviv Regev, Tel aviv (IL); Amit Moses, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/501,829

(22) Filed: Nov. 3, 2023

(65) Prior Publication Data

US 2025/0151098 A1 May 8, 2025

(51) Int. Cl.
*H04W 72/12* (2023.01)
*H04W 72/20* (2023.01)
(Continued)

(52) U.S. Cl.
CPC ......... *H04W 72/541* (2023.01); *H04W 72/12* (2013.01); *H04W 72/20* (2023.01); *H04W 72/563* (2023.01)

(58) Field of Classification Search
CPC ........... H04W 56/0045; H04W 56/006; H04W 24/08; H04L 5/0051; H04L 5/0048; H04L 5/0073; H04L 5/14
See application file for complete search history.

(56) References Cited

U.S. PATENT DOCUMENTS 9,755,871 B1 * 9/2017 Lee ..................... H04L 25/0204
10,326,565 B2 * 6/2019 Bayesteh .............. H04L 5/0044
(Continued)

FOREIGN PATENT DOCUMENTS

EP 4096110 A1 * 11/2022 ............ H04W 72/23
EP 4676118 A1 * 1/2026 ............ H04W 72/04

OTHER PUBLICATIONS

Moderator (Nokia), et al., "Summary #1 of Multi-TRP PUCCB and PUSCB Enhancements", 3GPP TSG RAN WG1 #106-e, Draft, R1-2108298, Mobile Competence Centre, 650, Route Des Lucioles, F-06921 Sophia-Antipolis Cedex, France, vol. RAN WG1 , No. e-Meeting, Aug. 16, 2021-Aug. 27, 2021, 51 Pages, Aug. 17, 2021 (Year: 2021).*

(Continued)

*Primary Examiner* — Lan-Huong Truong
(74) *Attorney, Agent, or Firm* — Holland & Hart LLP

(57) ABSTRACT

Methods, systems, and devices for wireless communication are described. A user equipment may transmit, to a serving network entity, a message requesting a quantity of transmission layers scheduled to be used by one or more neighbor network entities for communication within a communication resource. In response, the user equipment may receive, from the serving network entity, an indication of the quantity of transmission layers scheduled to be used by one or more neighbor network entities for communication within the communication resource. The user equipment may apply the quantity of transmission layers for the communication resource to a rank-aware interference rejection algorithm and may use the rank-aware interference rejection algorithm to improve a noise covariance matrix estimation. When receiving a downlink message, from the serving network entity via the communication resource, the improved noise (Continued)

covariance matrix estimation may be used to mitigate interference at the communication resource.

20 Claims, 19 Drawing Sheets

(51) Int. Cl.

| | |
|---|---|
| ***H04W 72/541*** | (2023.01) |
| ***H04W 72/563*** | (2023.01) |

(56) References Cited

U.S. PATENT DOCUMENTS

| | | | | |
|---|---|---|---|---|
| 11,140,639 | B1 | 10/2021 | Marupaduga et al. | |
| 2011/0159904 | A1 * | 6/2011 | Cho | H04W 72/20 455/509 |
| 2016/0254849 | A1 | 9/2016 | Moulsley | |
| 2023/0269700 | A1 | 8/2023 | Shimoda et al. | |
| 2023/0309144 | A1 * | 9/2023 | Zhu | H04W 56/0015 |

OTHER PUBLICATIONS

International Search Report and Written Opinion—PCT/US2024/047089—ISA/EPO—Dec. 23, 2024.

* cited by examiner

TECHNIQUES FOR RANK-AWARE INTERFERENCE REJECTION BASED ON NEIGHBOR CELL LAYER NOTIFICATION

FIELD OF TECHNOLOGY

The following relates to wireless communication, including techniques for rank-aware interference rejection based on neighbor cell layer notification.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, in order to avoid interference between downlink transmissions from the same base station, a base station may allocate unique resources to each of the UEs that the base station serves. However, in some cases, a base station may allot to its users, resources that are also allotted to users served by another base station within the wireless communications system. In such cases, the different base stations may simultaneously use the same resources for downlink communications, resulting in potential interference of the downlink signals at one or more of the UEs.

SUMMARY

The described techniques relate to improved methods, systems, devices, and apparatuses that support techniques for rank-aware interference rejection based on neighbor cell layer notification. In accordance with various aspects, the described techniques may provide for a determination, by a UE, of whether a level of interference within a communication resource (such as a resource for downlink communication from a serving network entity (e.g. a base station)) satisfies an interference threshold. Based on a determination that the level of interference satisfies the interference threshold, the UE may transmit, to the serving network entity, a message requesting notification of a quantity of transmission layers scheduled to be used by one or more neighbor network entities for communication within the communication resource. The serving network may deliver the request from the UE to a core network entity, and the core network entity may identify, as the one or more neighbor network entities, one or more network entities that are potential interferers to the serving network entity (such as one or more network entities in proximity to the serving network entity or the requesting UE or a combination thereof).

The core network entity may request that each of the neighbor network entities inform the core network entity of a quantity of transmission layers scheduled to be used by that neighbor network entity for communication within the communication resource. One or more of the neighbor network entities may inform the core network entity of the quantity of transmission layers scheduled to be used by that neighbor network entity for communication within the communication resource. The core network entity may receive the one or more responses from the one or more identified neighbor network entities and may aggregate (e.g., sum) the indicated quantities of transmission layers scheduled to be used for communication within the communication resource. The core network entity may transmit, to the serving network entity, an indication of the aggregated quantity of transmission layers scheduled to be used by the one or more identified neighbor network entities for communication within the communication resource, and the serving network entity may transmit the indication to the UE.

To mitigate interference from the one or more identified neighbor network entities, the UE may apply the aggregated quantity of transmission layers scheduled to be used by the one or more identified neighbor network entities for communication within the communication resource to a rank-aware channel estimation algorithm and may, subsequently, use the updated rank-aware channel estimation algorithm when receiving a downlink message via the communication resource. Use of the updated rank-aware channel estimation algorithm may improve an accuracy of an estimated interference and noise covariance matrix estimation associated with the communication resource, thereby enhancing communication reliability within wireless communications systems.

A method for wireless communications by a user equipment (UE) is described. The method may include transmitting, to a first network entity serving the UE, a first message including a request for a quantity of transmission layers scheduled to be used by one or more neighbor network entities for communication within a communication resource, receiving, from the first network entity, an indication of the quantity of transmission layers for the communication resource, and receiving, via the communication resource, a downlink message using a rank-aware channel estimation algorithm corresponding to the quantity of transmission layers for the communication resource.

A UE for wireless communications is described. The UE may include one or more memories storing processor executable code, and one or more processors coupled with the one or more memories. The one or more processors may individually or collectively operable to execute the code to cause the UE to transmit, to a first network entity serving the UE, a first message including a request for a quantity of transmission layers scheduled to be used by one or more neighbor network entities for communication within a communication resource, receive, from the first network entity, an indication of the quantity of transmission layers for the communication resource, and receive, via the communication resource, a downlink message using a rank-aware channel estimation algorithm corresponding to the quantity of transmission layers for the communication resource.

Another UE for wireless communications is described. The UE may include means for transmitting, to a first network entity serving the UE, a first message including a request for a quantity of transmission layers scheduled to be used by one or more neighbor network entities for communication within a communication resource, means for receiving, from the first network entity, an indication of the quantity of transmission layers for the communication resource, and means for receiving, via the communication resource, a downlink message using a rank-aware channel estimation algorithm corresponding to the quantity of transmission layers for the communication resource.

A non-transitory computer-readable medium storing code for wireless communications is described. The code may include instructions executable by a processor to transmit, to a first network entity serving the UE, a first message including a request for a quantity of transmission layers scheduled to be used by one or more neighbor network entities for communication within a communication resource, receive, from the first network entity, an indication of the quantity of transmission layers for the communication resource, and receive, via the communication resource, a downlink message using a rank-aware channel estimation algorithm corresponding to the quantity of transmission layers for the communication resource.

In some examples of the method, user equipment (UEs), and non-transitory computer-readable medium described herein, the first message may be transmitted based on noise covariance matrix estimation for the communication resource satisfying an interference threshold value.

Some examples of the method, user equipment (UEs), and non-transitory computer-readable medium described herein may further include operations, features, means, or instructions for receiving, from the first network entity, control information including an indication to perform the noise covariance matrix estimation within the communication resource.

In some examples of the method, user equipment (UEs), and non-transitory computer-readable medium described herein, the first message includes an indication of a granularity associated with the quantity of transmission layers and the granularity includes a quantity of transmission layers per resource element, a quantity of transmission layers per resource block, a quantity of transmission layers per slot, or a quantity of transmission layers per subcarrier.

In some examples of the method, user equipment (UEs), and non-transitory computer-readable medium described herein, the indication of the quantity of transmission layers includes a sum of quantities of transmission layers associated with the one or more neighbor network entities.

In some examples of the method, user equipment (UEs), and non-transitory computer-readable medium described herein, the indication of the quantity of transmission layers for the communication resource may be received via control signaling and the control signaling further includes a scheduling grant that allocates the communication resource to the UE.

In some examples of the method, user equipment (UEs), and non-transitory computer-readable medium described herein, the first message may be transmitted via a first medium access control-control element (MAC-CE) or a physical uplink control channel (PUCCH) and the indication of the quantity of transmission layers for the communication resource may be received via a second medium access control-control element (MAC-CE) or a physical downlink control channel (PDCCH).

A method for wireless communications by a first network entity is described. The method may include receiving, from a UE served by the first network entity, a first message including a request for a quantity of transmission layers scheduled to be used by one or more neighbor network entities for communication within a communication resource, transmitting, to a second network entity, a second message including a request for the quantity of transmission layers for the communication resource, receiving, from the second network entity, a third message including an indication of the quantity of transmission layers for the communication resource, and transmitting, to the UE, the indication of the quantity of transmission layers for the communication resource.

A first network entity for wireless communications is described. The first network entity may include one or more memories storing processor executable code, and one or more processors coupled with the one or more memories. The one or more processors may individually or collectively operable to execute the code to cause the first network entity to receive, from a UE served by the first network entity, a first message including a request for a quantity of transmission layers scheduled to be used by one or more neighbor network entities for communication within a communication resource, transmit, to a second network entity, a second message including a request for the quantity of transmission layers for the communication resource, receive, from the second network entity, a third message including an indication of the quantity of transmission layers for the communication resource, and transmit, to the UE, the indication of the quantity of transmission layers for the communication resource.

Another first network entity for wireless communications is described. The first network entity may include means for receiving, from a UE served by the first network entity, a first message including a request for a quantity of transmission layers scheduled to be used by one or more neighbor network entities for communication within a communication resource, means for transmitting, to a second network entity, a second message including a request for the quantity of transmission layers for the communication resource, means for receiving, from the second network entity, a third message including an indication of the quantity of transmission layers for the communication resource, and means for transmitting, to the UE, the indication of the quantity of transmission layers for the communication resource.

A non-transitory computer-readable medium storing code for wireless communications is described. The code may include instructions executable by a processor to receive, from a UE served by the first network entity, a first message including a request for a quantity of transmission layers scheduled to be used by one or more neighbor network entities for communication within a communication resource, transmit, to a second network entity, a second message including a request for the quantity of transmission layers for the communication resource, receive, from the second network entity, a third message including an indication of the quantity of transmission layers for the communication resource, and transmit, to the UE, the indication of the quantity of transmission layers for the communication resource.

In some examples of the method, first network entities, and non-transitory computer-readable medium described herein, the first message includes an indication of a granularity associated with the quantity of transmission layers and the granularity includes a quantity of transmission layers per resource element, a quantity of transmission layers per resource block, a quantity of transmission layers per slot, or a quantity of transmission layers per subcarrier.

In some examples of the method, first network entities, and non-transitory computer-readable medium described herein, the indication of the quantity of transmission layers may be based on the indicated granularity.

Some examples of the method, first network entities, and non-transitory computer-readable medium described herein may further include operations, features, means, or instructions for transmitting, to the UE, control information including an indication to perform noise covariance matrix estimation for the communication resource.

In some examples of the method, first network entities, and non-transitory computer-readable medium described herein, the indication of the quantity of transmission layers for the communication resource may be transmitted to the UE via control signaling and the control signaling further includes a scheduling grant that allocates the communication resource to the UE.

In some examples of the method, first network entities, and non-transitory computer-readable medium described herein, the first network entity includes a serving gNodeB (gNB) serving the UE, the one or more neighbor network entities include one or more interferer gNBs, and the second network entity includes a core network entity serving a set of multiple gNBs, the set of multiple gNBs including the serving gNB and the one or more interferer gNBs.

In some examples of the method, first network entities, and non-transitory computer-readable medium described herein, the first message includes information indicating an estimated geolocation of the UE.

In some examples of the method, first network entities, and non-transitory computer-readable medium described herein, the first message may be received via a first medium access control-control element (MAC-CE) or a PUCCH and the indication of the quantity of transmission layers for the communication resource may be transmitted via a second medium access control-control element (MAC-CE) or a PDCCH.

A method for wireless communications by a second network entity is described. The method may include receiving, from a first network entity, a message including a request for a quantity of transmission layers scheduled to be used by one or more neighbor network entities for communication within a communication resource, requesting, from at least one neighbor network entity of the one or more neighbor network entities, a quantity of transmission layers scheduled to be used by the at least one neighbor network entity for communication within the communication resource, and transmitting, to the first network entity, an indication of the quantity of transmission layers scheduled to be used by the at least one neighbor network entity for communication within the communication resource.

A second network entity for wireless communications is described. The second network entity may include one or more memories storing processor executable code, and one or more processors coupled with the one or more memories. The one or more processors may individually or collectively operable to execute the code to cause the second network entity to receive, from a first network entity, a message including a request for a quantity of transmission layers scheduled to be used by one or more neighbor network entities for communication within a communication resource, request, from at least one neighbor network entity of the one or more neighbor network entities, a quantity of transmission layers scheduled to be used by the at least one neighbor network entity for communication within the communication resource, and transmit, to the first network entity, an indication of the quantity of transmission layers scheduled to be used by the at least one neighbor network entity for communication within the communication resource.

Another second network entity for wireless communications is described. The second network entity may include means for receiving, from a first network entity, a message including a request for a quantity of transmission layers scheduled to be used by one or more neighbor network entities for communication within a communication resource, means for requesting, from at least one neighbor network entity of the one or more neighbor network entities, a quantity of transmission layers scheduled to be used by the at least one neighbor network entity for communication within the communication resource, and means for transmitting, to the first network entity, an indication of the quantity of transmission layers scheduled to be used by the at least one neighbor network entity for communication within the communication resource.

A non-transitory computer-readable medium storing code for wireless communications is described. The code may include instructions executable by a processor to receive, from a first network entity, a message including a request for a quantity of transmission layers scheduled to be used by one or more neighbor network entities for communication within a communication resource, request, from at least one neighbor network entity of the one or more neighbor network entities, a quantity of transmission layers scheduled to be used by the at least one neighbor network entity for communication within the communication resource, and transmit, to the first network entity, an indication of the quantity of transmission layers scheduled to be used by the at least one neighbor network entity for communication within the communication resource.

In some examples of the method, second network entities, and non-transitory computer-readable medium described herein, the message includes information indicating an estimated geolocation of a UE served by the first network entity.

Some examples of the method, second network entities, and non-transitory computer-readable medium described herein may further include operations, features, means, or instructions for identifying the one or more neighbor network entities based on a determination of one or more candidate network entities having a potential to interfere with the first network entity.

In some examples of the method, second network entities, and non-transitory computer-readable medium described herein may the determination of the one or more candidate network entities may be based on an estimated geolocation of a UE that requests the quantity of transmission layers.

In some examples of the method, second network entities, and non-transitory computer-readable medium described herein, the first network entity includes a serving gNodeB (gNB) serving a UE that requests the quantity of transmission layers, the one or more neighbor network entities include one or more interferer gNBs, and the second network entity includes a core network entity serving a set of multiple gNBs, the set of multiple gNBs including the serving gNB and the one or more interferer gNBs.

DETAILED DESCRIPTION

Various aspects of the present disclosure relate to techniques for rank-aware interference rejection based on neighbor cell layer notification in wireless communications systems. In some wireless communications systems, a plurality of network entities may each serve one or more UEs. In some cases, to avoid interference during downlink communication from a network entity to the served UEs, the network entity may allocate a unique set of communication resources to each of the UEs that the network entity serves. However, while intra-resource allocation by a network entity may be unique amongst the served UEs, there may be cases in which a network entity allocates to one or more of its served UEs, communication resources that are also allocated to one or more UEs served by another network entity within the wireless communications system. In some cases, the simultaneous usage of such shared communication resources by multiple UEs across different network entities may cause interference at one or more UEs during downlink communication.

In accordance with various techniques described herein, improved techniques may enable an accuracy of an estimated interference and noise covariance matrix estimation associated with a communication resource to be improved. For instance, based on a determination by a UE that a level of interference within a communication resource satisfies an interference threshold, the UE may transmit, to its serving network entity, a message requesting notification of a quantity of transmission layers scheduled to be used by one or more neighbor network entities for communication within the communication resource. In response, the serving network entity may identify and transmit to the UE, the quantity of transmission layers scheduled to be used by one or more neighbor network entities for communication within the communication resource. To mitigate interference at the communication resource, the UE may apply the quantity of transmission layers to a rank-aware channel estimation algorithm and may, subsequently, use the updated rank-aware channel estimation algorithm to receive a downlink message via the communication resource. Use of the updated rank-aware channel estimation algorithm may improve an accuracy of an estimated interference and noise covariance matrix estimation associated with the communication resource.

Aspects of the disclosure are initially described in the context of wireless communications systems. Aspects of the disclosure are further illustrated by and described with reference to process flows, apparatus diagrams, system diagrams, and flowcharts that relate to techniques for rank-aware interference rejection based on neighbor cell layer notification.

Figure 1:
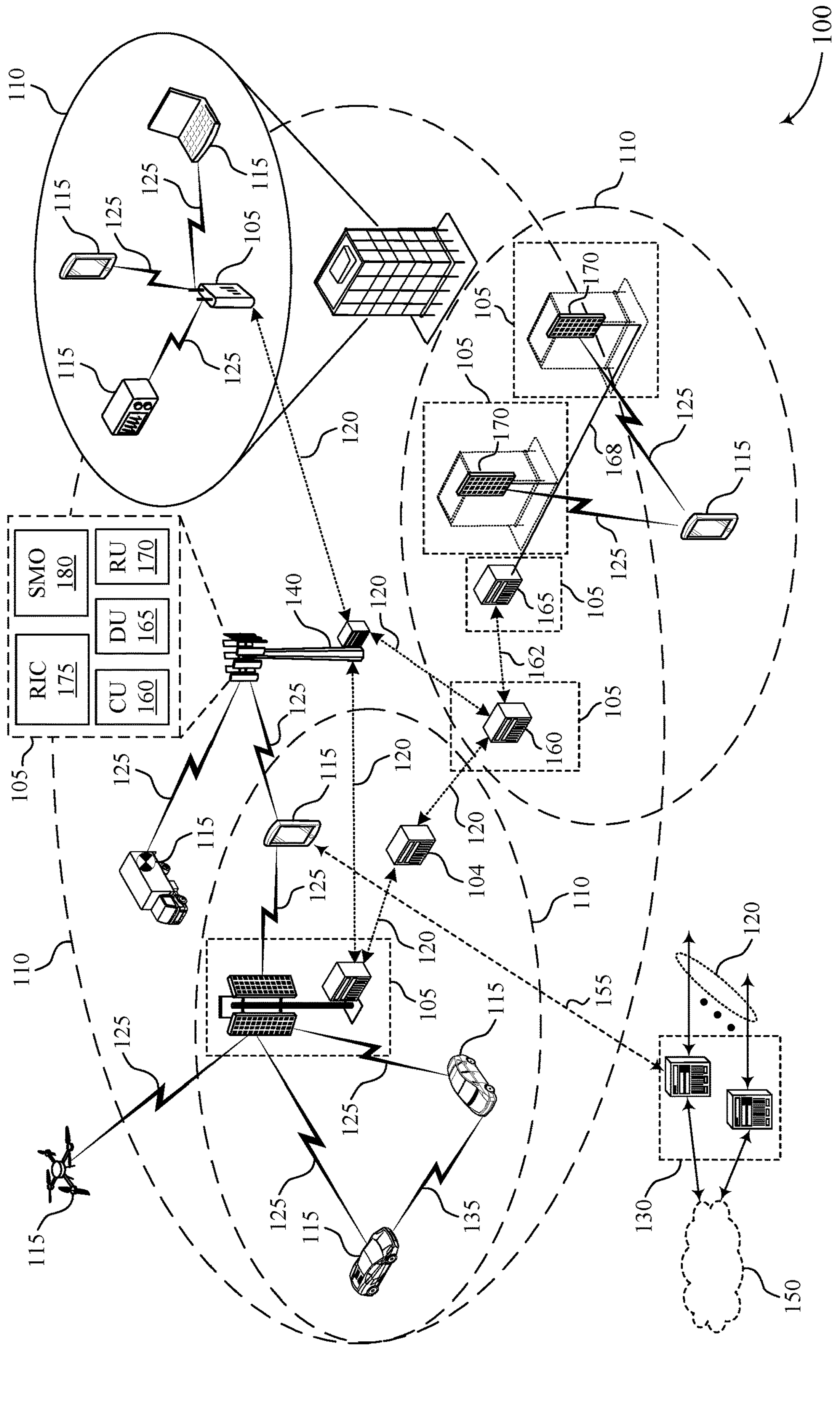
FIG. 1 shows an example of a wireless communications system that supports techniques for rank-aware interference rejection based on neighbor cell layer notification in accordance with one or more aspects of the present disclosure.

FIG. 1 shows an example of a wireless communications system 100 that supports techniques for rank-aware interference rejection based on neighbor cell layer notification in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for rank-aware interference rejection based on neighbor cell layer notification as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighbor cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a UE 115 may determine that a level of interference within a communication resource satisfies an interference threshold. In response, the UE 115 may transmit, to its serving network entity 105-*a*, a message requesting notification of a quantity of transmission layers scheduled to be used by one or more neighbor network entities 105-*b* for communication within the communication resource. The UE 115 may receive, from the serving network entity 105-*a*, an indication of the quantity of transmission layers scheduled to be used by one or more neighbor network entities 105-*b* for communication within the communication resource. To mitigate potential interference within the communication resource, the UE 115 may apply the quantity of transmission layers to a rank-aware channel estimation algorithm and may use the updated rank-aware channel estimation algorithm to receive a downlink message from the serving network entity 105-*a* via the communication resource. Use of the updated rank-aware channel estimation algorithm, which considers a quantity of transmission layers scheduled to be used by potential interfering neighbor network entities 105-*b* for communication within a communication resource, may improve an accuracy of an estimated interference and noise covariance matrix estimation associated with the communication resource. The improved accuracy associated with interference estimation may enable more precise interference mitigation thereby enhancing performance at the UE 115 and overall communication reliability at the wireless communications system.

Figure 2:
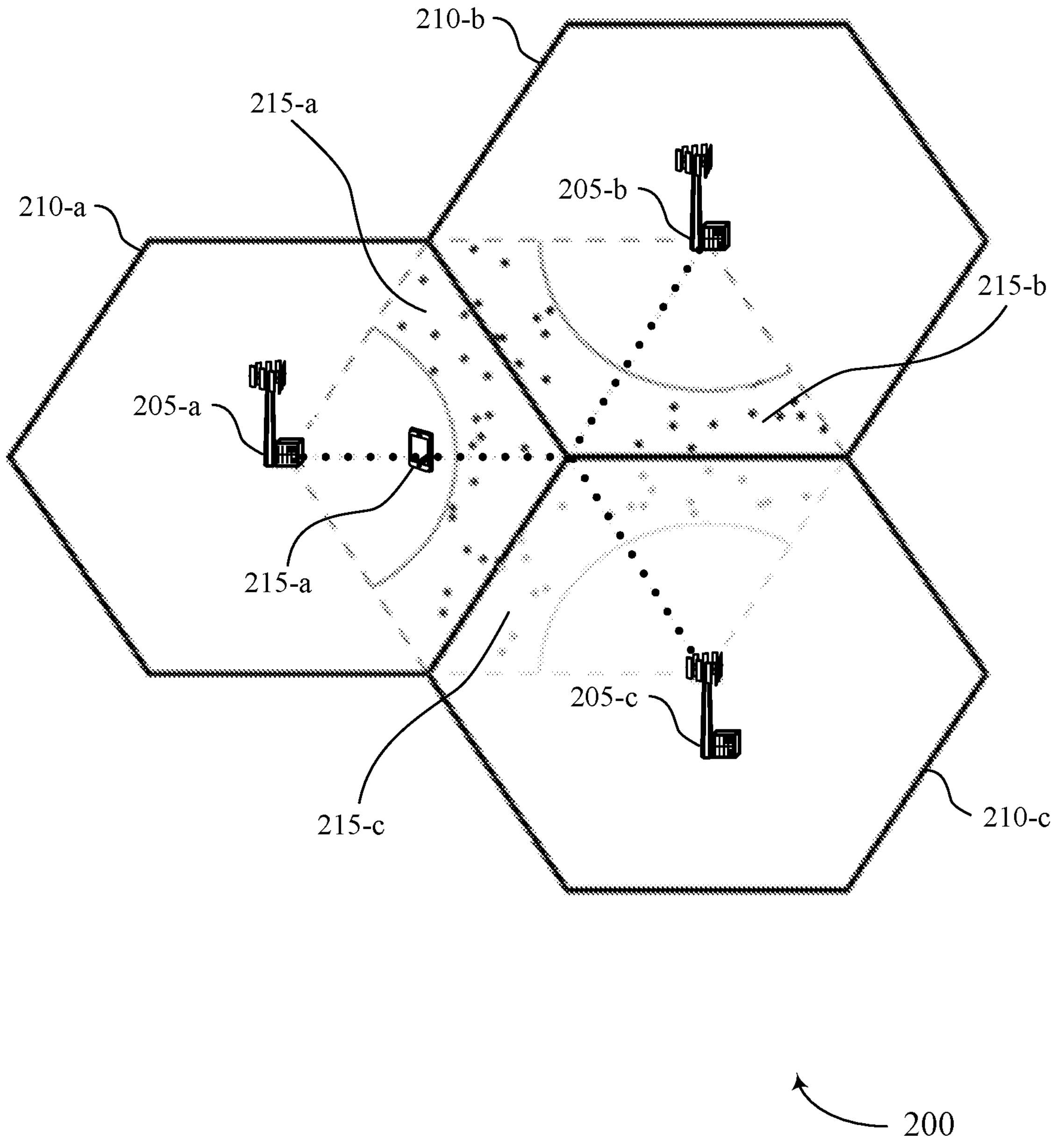
FIG. 2 shows an example of a wireless communications system environment that supports techniques for rank-aware interference rejection based on neighbor cell layer notification in accordance with one or more aspects of the present disclosure.

FIG. 2 shows an example of a wireless communications system environment 200 that supports techniques for rank-aware interference rejection based on neighbor cell layer notification in accordance with one or more aspects of the present disclosure. In the example environment 200, a wireless system may consist of a plurality of network entities 205 (e.g., network entity 105 of FIG. 1). Each network entity 205 (e.g., gNodeBs (gNBs)) may provide communication coverage via one or more cells. In some cases, a cell may refer to a coverage area, such as coverage area 210 (e.g., coverage area 110 of FIG. 1) over which the corresponding network entity 205 provides communication coverage. Each of the plurality of network entities 205 may serve one or more UEs 215 (e.g., UE 115 of FIG. 1) within a corresponding coverage area 210. For instance, each network entity 205 may serve those UEs 215 that are in closest proximity to the network entity 205. For example, network entity 205-*a* may serve UEs 215-*a* within coverage area 210-*a*; network entity 205-*b* may serve UEs 215-*b* within coverage area 210-*b*; and network entity 205-*c* may serve UEs 215-*c* within coverage area 210-*c*. As described herein, a network entity 205 that serves a particular UE 215 may be referred to as the serving network entity 205 of that UE 215.

In some cases, each network entity 205 may allocate a unique set of communication resources to each UE 215 that the network entity 205 serves. For example, a serving network entity 205 may allocate a unique frequency band and a unique time slot to each UE 215 that the serving network entity 205 serves. By allocating unique sets of communication resources to each UE 215, interferences between downlink communications from the serving network entity 205 may be mitigated or reduced. In some cases, however, one or more of the network entities 205 may allocate to one or more of its UEs 215, communication resources that are also allocated to one or more UEs 215 served by another network entity 205, resulting in simultaneous usage of the same communication resources. In some cases, such as when the UEs 215 sharing such communication resources (or their respective serving network entities 205) are not in proximity to one another, the simultaneous usage of the same communication resources may not present an interference issue in view of the large path loss resulting from a distance between such UEs 215 (or their respective serving network entities 205). In other cases, however, such as when the UEs 215 (or their respective serving network entities 205) sharing such communication resources are in proximity to one another, the simultaneous usage of the same communication resources may cause downlink detection by an affected UE 215 to be compromised by the downlink transmissions of the network entities 205 in proximity to the serving network entity 205 of the affected UE 215. For example, in a case where a serving network entity 205-*a* transmits a downlink message to UE 215-*a*, downlink signals transmitted by one or more other network entities 205 in proximity to serving network entity 205-*a* (such as downlink signals transmitted by neighbor network entities 205-*b* and 205-*c*) using the same communication resources may cause interference and may affect the ability for UE 215-*a* to detect the downlink message transmitted to UE 215-*a* by the serving network entity 205-*a*. As described herein, the network entities 205 in proximity to a serving network entity 205 of a UE 215 whose downlink detection may be affected may be referred to as neighbor network entities 205 or in some cases as potential interferer network entities 205. For instance, in the above example, network entity 205-*a* may be referred to as the serving network entity 205-*a* of UE 215-*a* and network entities 205-*b* and 205-*c* may be referred to, respectively, as neighbor network entities 205-*b* and 205-*c*, or in some cases, collectively, as neighbor network entities 205-*b*.

For instance, in some cases, the coverage area 210 supported by a network entity 205 (e.g., a network structure) may form a hexagonal structure or shape in one or more directions from the network entity 205. In such cases, the coverage range of the network entity 205 may extend in any such direction to cover a hexagonal shaped coverage area 210. Accordingly, in some cases, the coverage areas 210 of one or more network entities 205 may overlap. As a result, each UE 215 served by its serving network entity 205 might also receive downlink signals transmitted by one or more other network entities 205 in proximity to the serving network entity 205 of the UE 215 or in proximity to the UE 215.

For instance, UEs 215-*a* served by network entity 205-*a* might also receive downlink signals transmitted by neighbor network entities 205-*b* and 205-*c*. In this case, an observed signal at the UE 215-*a* may be expressed as $y=H_1x_1+H_2x_2+H_3x_3+n$, where $H_1$ is the main downlink signal transmitted to the UE 215-*a* from the serving network entity 205-*a*, where $H_2$ and $H_3$ are the respective channel interferences between the neighbor network entities 205-*b* and 205-*c* and the UE 215-*a* (e.g., from downlink signals from neighbor network entities 205-*b* and 205-*c*), where $x_1$, $x_2$, and $x_3$ are the respective data transmitted from each of the network entities 205-*a*, 205-*b*, and 205-*c*, and where n is the receiver thermal noise of the UE 215-*a*.

In some cases, interference caused by downlink signals from the one or more neighbor network entities 205-*b* and 205-*c* may be significantly lower as compared to interference at a desired main downlink signal transmitted to the UE 215-*a* by the serving network entity 205-*a*, such as when condition $\|H_3x_3\|, \|H_2x_2\| << \|H_1x_1\|, \|n\|$ is satisfied. Thus, the observed signal at the UE 215-*a*, in such cases, can be expressed as $y=H_1x_1+n$.

However, when the condition $\|H_3x_3\|, \|H_2x_2\| << \|H_1x_1\|, \|n\|$ is not satisfied, downlink detection at the UE 215-*a* may be interfered with by downlink signals from one or more of the neighbor network entities 205-*b* and 205-*c*. In some cases, the neighbor network entities 205-*b* and 205-*c* might limit the achievable signal to noise ratio (SNR), thus limiting the attainable data rate. In accordance with aspects described herein, the served UE 215, such as UE 215-*a*, may mitigate interference from the neighbor network entities 205-*b* and 205-*c* by using a rank-aware channel estimation algorithm (e.g., a rank-aware interference rejection algorithm (described further with respect to FIG. 3)). For instance, an interference rejection algorithm may be enhanced by improving an accuracy of an estimated interference and noise covariance matrix ($C_{zz}$) estimation performed by the served UE 215-*a* based on a rank (e.g. a quantity of transmission layers) of the one or more neighbor network entities 205-*b* and 205-*c*. The enhanced interference rejection algorithm may be referred to as a rank-aware channel estimation algorithm or a rank-aware interference rejection algorithm. For instance, the served UE 215-*a* may obtain a sum of the ranks of downlink signals of the neighbor network entities 205-*b* and 205-*c* (e.g., a sum of the quantities of transmission layers scheduled to be used by the neighbor network entities 205-*b* and 205-*c*) for a particular communication resource and may determine whether the summed ranks (e.g., the summed quantities of the transmission layers to be used) satisfies a threshold. For instance, the summed ranks may satisfy the threshold when the summed ranks is less than a total quantity of receive antennas at the UE 215-*a*. If the summed rank satisfies the threshold, the served UE 215-*a* may use the rank-aware channel estimation algorithm to improve the noise covariance matrix estimation performed by the UE 215-*a*.

Figure 3:
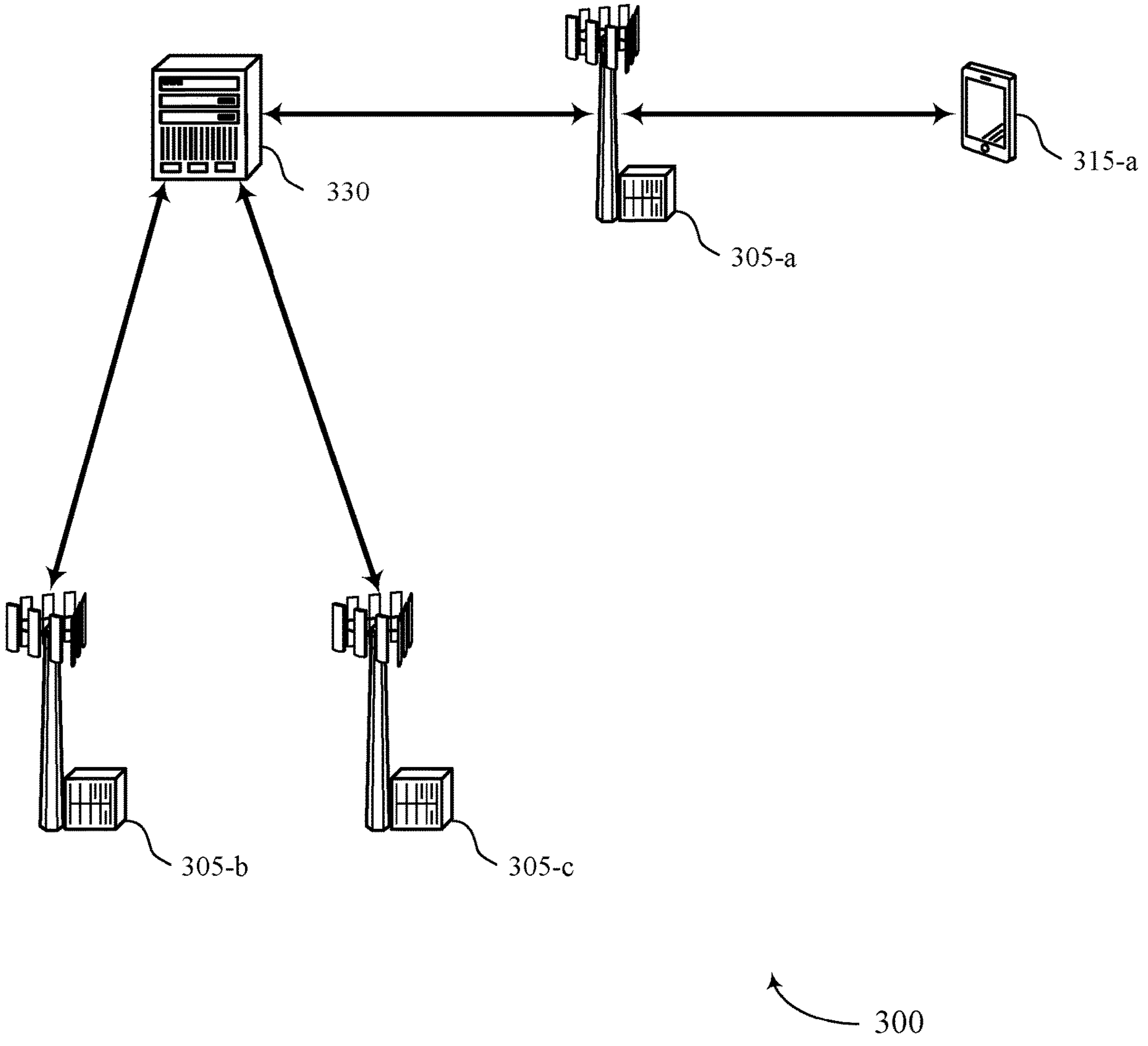
FIG. 3 shows an example of a wireless communications system environment that supports techniques for rank-aware interference rejection based on neighbor cell layer notification in accordance with one or more aspects of the present disclosure.

FIG. 3 shows an example of a wireless communications system environment 300 that supports techniques for rank-aware interference rejection based on neighbor cell layer notification in accordance with one or more aspects of the present disclosure.

In the example environment 300, a wireless system may consist of a UE 315-*a* (e.g., UE 115 of FIG. 1 or UEs 215-*a*, 215-*b*, or 215-*c* of FIG. 2) served by a serving network entity 305-*a* (e.g., network entity 105 of FIG. 1 or network entities 205-*a*, 205-*b*, or 205-*c* of FIG. 2). The serving network entity 305-*a* may be in proximity to one or more neighbor network entities 305-*b* and 305-*c* (e.g., network entity 105 of FIG. 1 or network entities 205-*a*, 205-*b*, or 205-*c* of FIG. 2). The serving network entity 305-*a* and the one or more neighbor network entities 305-*b* and 305-*c* may communicate with a core network entity 330 (e.g., core network 130 of FIG. 1).

To determine whether it may be necessary to apply a rank-aware channel estimation algorithm (e.g., a rank-aware interference rejection algorithm) to mitigate potential interference in downlink communications from the serving network entity 305-*a* as a result of downlink signals from the one or more neighbor network entities 305-*b* and 305-*c*, the UE 315-*a* may initially determine an interference level (e.g., a power of received interference) associated with the one or more neighbor network entities 305-*b* and 305-*c*. For instance, the UE 315-*a* may determine an interference level for a particular communication resource, such as a slot for downlink communication. The UE 315-*a* may determine that if the interference level associated with the one or more neighbor network entities 305-*b* and 305-*c* satisfies an interference threshold (e.g., whether high interference is detected), the rank-aware channel estimation algorithm should be applied to mitigate interference at the communication resource.

In some cases, to determine whether the interference level associated with the one or more neighbor network entities 305-*b* and 305-*c* satisfies the interference threshold (e.g., whether high interference is detected), the UE 315-*a* may estimate a noise covariance ($\hat{C}_I$) for the communication resource. The noise covariance may be estimated by averaging the noise across the entire bandwidth. Assuming the example two neighbor network entities 305-*b* and 305-*c* (it is noted that the described process for detecting high interference may not be limited to two neighbor network entities, and there instead may be any number of neighbor network entities), then the noise covariance may be expressed as $$\hat{C}_I \approx C_n + H_2 H_2^H + H_3 H_3^H$$

(up to an estimation error), where $C_n$ is diagonal (representing the RF noise matrix), and $$H_2 H_2^H + H_3 H_3^H$$

is the noise matrix of neighbor network entities 305-*b* and 305-*c* and is the non-diagonal term, so that the diagonal element of $\hat{C}_I$ can be expressed as:

$$\hat{C}_I(i,i) = \sigma_n^2 + \sum_{k=1}^{N_{layers2}} |H_2(i,k)|^2 + \sum_{k=1}^{N_{layers3}} |H_3(i,k)|^2 \equiv \sigma_n^2 + P(i)$$

While the non-diagonal element of $\hat{C}_I$ may be expressed as:

$$\hat{C}_I(i,j) = \sum_{k=1}^{N_{layers2}} H_2(i,k) H_2^*(j,k) + \sum_{k=1}^{N_{layers3}} H_3(i,k) H_3^*(j,k)$$

Where $|\hat{C}_I(i,j)| \leq \sqrt{P(i)P(j)} \leq \max(P(i), P(j))$. In some implementations, an example metric on $\hat{C}_I$ may be a function of the inverse of the ratio between the maximal non-diagonal element absolute value, and its corresponding maximal diagonal element. The maximal non-diagonal element absolute value row and column may be denoted as $(\tilde{i}, \tilde{j})$, and may be explicitly expressed as:

$$(\tilde{i}, \tilde{j}) = \underset{\substack{i=1, \ldots, N_{Rx} \\ j=(i+1), \ldots, N_{Rx}}}{\operatorname{argmax}} \left|\hat{C}_I(i,j)\right|.$$

Therefore, the corresponding maximal diagonal element is:

$$\tilde{r} = \underset{(r=\tilde{i},\tilde{j})}{\operatorname{argmax}} \hat{C}_I(r,r)$$

(explicitly: the maximum between $\hat{C}_I(\tilde{i},\tilde{i})$ and $\hat{C}_I(\tilde{j},\tilde{j})$). For example, if:

$$\hat{C}_I = \begin{pmatrix} 1.02 & 0.45 & 0.55 & 0.2 \\ 0.45 & 1.07 & 0.3 & -0.65 \\ 0.55 & 0.3 & 1.05 & 0.2 \\ 0.2 & -0.65 & 0.2 & 1.03 \end{pmatrix},$$

then the ratio is $$\frac{0.65}{\max(1.07, 1.03)}$$

and the metric is:

$$\frac{1}{\frac{1.07}{0.65} - 1} = 1.55.$$

Further, the inverse of the ratio is $$\frac{\hat{C}_I(\tilde{r},\tilde{r})}{\left|\hat{C}_I(\tilde{i},\tilde{j})\right|},$$

and based on this ratio, the following metric may be calculated:

$$m = \frac{1}{\frac{\hat{C}_I(\tilde{r}, \tilde{r})}{|\hat{C}_I(\tilde{\imath}, \tilde{J})|} - 1} = \frac{|\hat{C}_I(\tilde{\imath}, \tilde{J})|}{\hat{C}_I(\tilde{r}, \tilde{r}) - |\hat{C}_I(\tilde{\imath}, \tilde{J})|} \le \frac{\max(P(\tilde{\imath}), P(\tilde{J}))}{\hat{C}_I(\tilde{r}, \tilde{r}) - \max(P(\tilde{\imath}), P(\tilde{J}))} = \frac{\max(P(\tilde{\imath}), P(\tilde{J}))}{\sigma_n^2 + \max(P(\tilde{\imath}), P(\tilde{J})) - \max(P(\tilde{\imath}), P(\tilde{J}))} = \frac{\max(P(\tilde{\imath}), P(\tilde{J}))}{\sigma_n^2}$$

Where m is an upper bound on the interference to noise ratio. Accordingly, when $m \ge M$ (e.g., a threshold value), the UE 315-*a* may determine that the level of interference of the one or more neighbor network entities 305-*b* and 305-*c* satisfies the interference threshold (e.g., is high enough as compared to the noise level), such that the rank-aware channel estimation algorithm (e.g., rank-aware interference rejection algorithm) should be applied to mitigate interference at the communication resource.

Accordingly, when the level of interference satisfies the threshold, the UE 315-*a* may transmit a request to the serving network entity 305-*a* for an indication of a quantity of transmission layers scheduled to be used by the one or more neighbor network entities 305-*b* and 305-*c* for communication within the communication resource. In some cases, the request may be for an aggregated quantity (e.g., a sum) of transmission layers scheduled to be used by the one or more neighbor network entities 305-*b* and 305-*c* for communication within the communication resource. For example, the aggregated quantity may be a sum of the quantities of transmission layers associated with each of the one or more neighbor network entities 305-*b* and 305-*c*. In some cases, the request may indicate a particular granularity at which the quantity of transmission layers should be reported, such as per resource element, per resource block, or per subcarrier. In some cases, the particular level of granularity may be based on a configuration of the serving network entity 305-*a*, a configuration of the neighbor network entities 305-*b* and 305-*c*, or a combination thereof.

The aggregated quantity of layers scheduled to be used by the one or more neighbor entities 305-*b* and 305-*c* may be the rank of the interference observed by the UE 315-*a*. The UE 315-*a* may use the aggregated quantity of layers to apply to the rank-aware channel estimation algorithm (e.g., rank-aware interference rejection algorithm), and may use the rank-aware channel estimation algorithm to improve noise covariance matrix ($C_{zz}$) estimation.

In some implementations, the rank-aware interference rejection algorithm may be determined as follows. The frequency domain (FD) received signal at the UE 315-*a* may be expressed as $\underline{y}(f)=H_1(f)\underline{x_1}(f)+(H_2(f)\underline{x_2}(f)+H_3(f)\underline{x_3}(f)+n)$. The noise observed by the UE 315-*a* may be expressed as $\underline{z}(f)=H_2(f)\underline{x_2}(f)+H_3(f)\underline{x_3}(f)+\underline{n}$. Where $H_2(f)$ and $H_3(f)$ are respective channel matrices of the one or more neighbor network entities 305-*b* and 305-*c*, with respective sizes $[N_{Rx}, N_{layers2}(f)]$ and $[N_{Rx}, N_{layers3}(f)]$. Where $\underline{x_2}(f)$ and $\underline{x_3}(f)$ are respective transmitted signal vectors for the one or more neighbor network entities 305-*b* and 305-*c*, with respective sizes $[N_{layers2}(f), 1]$ and $[N_{layers3}(f), 1]$. Where $\underline{n}$ is an Additive White Gaussian Noise (AWGN) vector with size $[N_{Rx}, 1]$. The noise covariance matrix observed by the UE 315-*a* may be expressed as $C_{zz}(f)=E\{\underline{nn}^H\}+E\{(H_2(f)x_2(f))(H_2(f)x_2(f))^H\}+E\{H_3(f)x_3(f))(H_3(f)x_3(f))^H\}$. Based on the knowledge that a consecutive number of subcarriers in which the precoders of the one or more neighbor network entities 305-*b* and 305-*c* are not changing, and in which (e.g., in addition) the channels of the one or more neighbor network entities 305-*b* and 305-*c* are almost constant, $C_{zz}$ may be approximated as: $C_{zz} \approx E\{\underline{nn}^H\}+H_2H_2^H+H_3H_3^H=\sigma^2 I+C_{I2}+C_{I3}$. Assuming that the quantity of transmission layers of the signals of the one or more neighbor network entities 305-*b* and 305-*c* within this consecutive number of subcarriers are $N_{layers2}$ and $N_{layers3}$, respectively, then the rank of $C_{I2}$ is $N_{layers2}$ and the rank of $C_{I3}$ is $N_{layers3}$. The sum of these ranks may be expressed as $N_{tot}$. Looking at an eigen value decomposition (EVD) of $C_{I2}+C_{I3}(C_{I2}+C_{I3}=VSV^H)$ it may be proven that S is diagonal, and that it has the values:

$$\overbrace{\lambda_1}^{1}, \ldots, \overbrace{\lambda_{N_{tot}}}^{N_{tot}}, \overbrace{0}^{N_{tot}+1}, \ldots, \overbrace{0}^{N_{Rx}}.$$

Further, since $C_{I2}+C_{I3}=VSV^H$, it may be observed that: $\sigma^2 I+C_{I2}+C_{I3}=V(S+\sigma^2 I)V^H$ and, therefore, the EVD decomposition of $C_{zz}$ is $C_{zz}=V\bar{\lambda}V^H$, where $\bar{\lambda}$ diagonal has the values $$\overbrace{\lambda_1+\sigma^2}^{1}, \ldots, \overbrace{\lambda_{N_{tot}}+\sigma^2}^{N_{tot}}, \overbrace{\sigma^2}^{N_{tot}+1}, \ldots, \overbrace{\sigma^2}^{N_{Rx}}.$$

When an initial estimation of the noise is performed by: $\hat{C}_{zz}=\Sigma_{f \in G_i}(\bar{y}(f)-H_1(f)\underline{x_1}(f))(\underline{y}(f)-H_1(f)\underline{x_1}(f))^H$, a singular value decomposition (SVD) of the estimated covariance matrix $\hat{C}_{zz}$ may be seen as the same values as previously mentioned, but with estimation errors:

$$\overbrace{\lambda_1+\sigma^2+\varepsilon_1}^{1}, \ldots, \overbrace{\lambda_{N_{tot}}+\sigma^2+\varepsilon_{N_{tot}}}^{N_{tot}}, \overbrace{\sigma^2+\varepsilon_{N_{tot}+1}}^{N_{tot}+1}, \ldots, \overbrace{\sigma^2+\varepsilon_{N_{Rx}}}^{N_{Rx}}.$$

These eigenvalues that lie on the diagonal of $\hat{S}$ may be expressed as: $\hat{\lambda}_1, \hat{\lambda}_2, \ldots, \hat{\lambda}_{N_{Rx}}$, and the eigenvectors matrix as: $\hat{V}$ so that: $\hat{C}_{zz}=\hat{V}\hat{S}\hat{V}^H$. The estimation errors may be caused by various factors, such as the number of the consecutive REs where the estimation is performed is not small enough, causing the channels of the one or more neighbor network entities 305-*b* and 305-*c* to change (in some cases, slightly), so that the channel covariance of the one or more neighbor network entities 305-*b* and 305-*c* may be slightly ambiguous; the number of consecutive REs where the estimation is performed is not large enough, causing the symbols of the one or more neighbor network entities 305-*b* and 305-*c* and the AWGN not to be sufficiently attenuated upon averaging; or other noises, such as the channel estimation error of the UE 315-*a* (which may not be constant inside this group of consecutive REs) may affect the estimation. The rank-aware interference rejection algorithm estimated covariance matrix may be expressed as $\bar{C}_{zz}$, and its eigenvalues $\bar{\lambda}_1, \bar{\lambda}_2, \ldots, \bar{\lambda}_{N_{Rx}}$ (that lie on the diagonal of $\bar{S}$). Further, it may be derived that at least for Rank 1, Rank 2, a good rank-aware channel estimation algorithm would assume that the higher eigenvalues should be preserved, meaning: $\bar{\lambda}_1=\hat{\lambda}_1, \bar{\lambda}_2=\hat{\lambda}_2, \ldots, \bar{\lambda}_{N_{tot}}=\hat{\lambda}_{N_{tot}}$; or that the next eigenvalues contain a large portion of the estimation error, and might be ignored, and that the lower eigenvalues should be used to estimate the AWGN noise, meaning: $\bar{\lambda}_{N_{tot}+1}=\bar{\lambda}_{N_{tot}+2}= \ldots =\bar{\lambda}_{N_{Rx}}=\hat{\sigma}^2$, where: $\hat{\sigma}^2$ mean $(\hat{\lambda}_{N_{tot}+1+offset}, \ldots, \hat{\lambda}_{N_{Rx}})$ and that the offset might be chosen as ~1 or ~2. To complete the estimation: $\bar{C}_{zz}=\hat{V}\bar{S}\hat{V}^H$, which yields the rank-aware channel estimation algorithm for estimating the covariance matrix of the interferers (e.g., the one or more neighbor network entities 305-*b* and 305-*c*) and noise.

Figure 4:
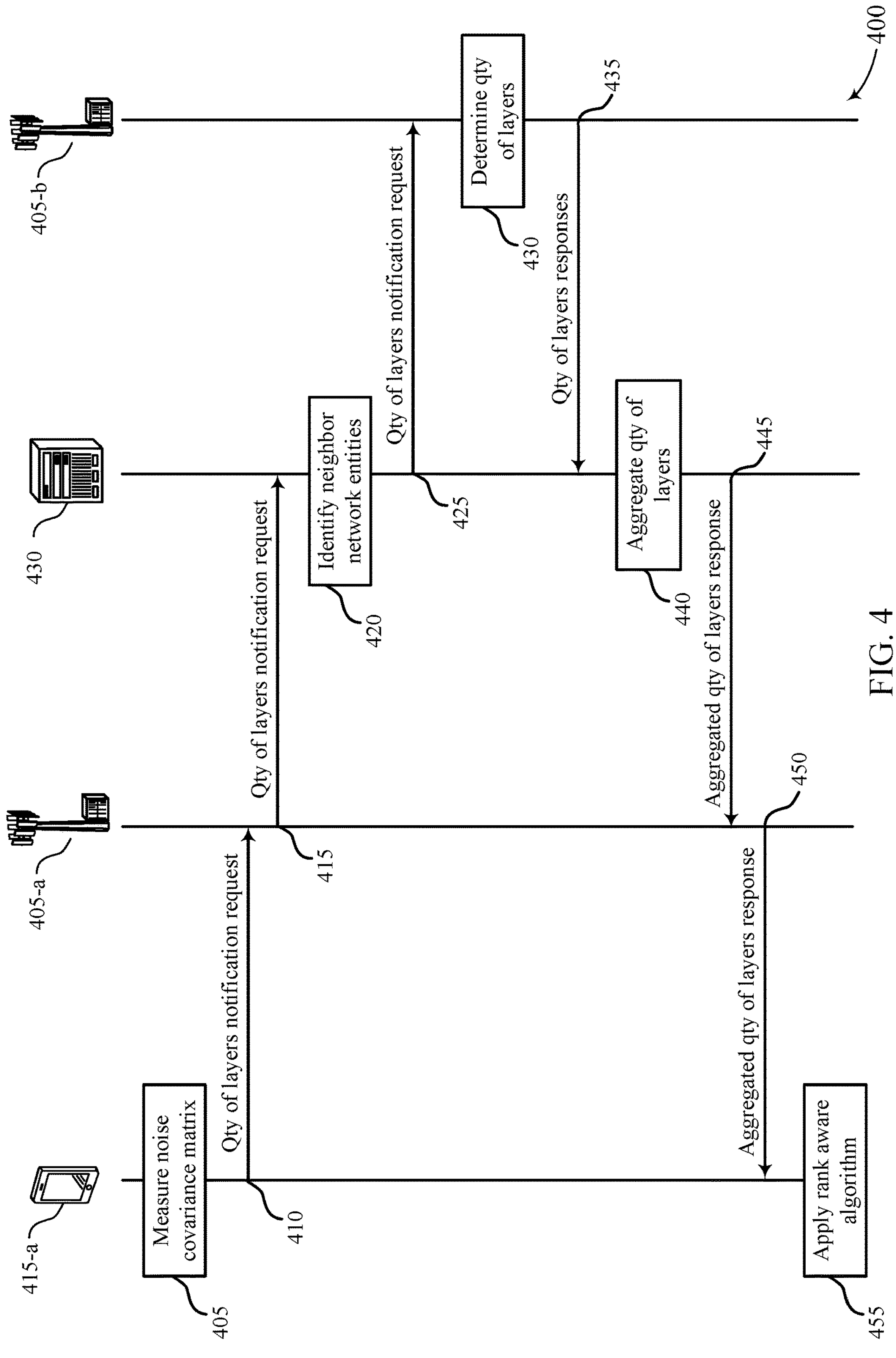
FIG. 4 shows an example of a process flow that supports techniques for rank-aware interference rejection based on neighbor cell layer notification in accordance with one or more aspects of the present disclosure.

FIG. 4 shows an example of a process flow 400 that supports techniques for rank-aware interference rejection based on neighbor cell layer notification in accordance with one or more aspects of the present disclosure.

In some examples, process flow 400 may implement aspects of wireless communications system 100. Process flow 400 may be implemented by a UE 415-*a*, a serving network entity 405-*a*, one or more neighbor network entities 405-*b*, and a core network entity 430. In the following description of the process flow 400, the communications between the UE 415-*a*, the serving network entity 405-*a*, the one or more neighbor network entities 405-*b*, and the core network entity 430 may be transmitted in a different order than the example order shown, or the operations performed by the UE 415-*a*, the serving network entity 405-*a*, the one or more neighbor network entities 405-*b*, and the core network entity 430 may be performed in different orders or at different times. Some operations may also be omitted from the process flow 400, and other operations may be added to the process flow 400.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At step 405, the UE 415-*a* may measure or estimate the noise covariance matrix associated with a particular communication resource, e.g., a downlink slot, to determine a level of interference associated with the communication resource. In some cases, the UE 415-*a* may receive an indication, from the serving network entity 405-*a*. to perform the noise covariance matrix estimation for the communication resource. In such cases, the request may be received periodically, aperiodically, or randomly. In some cases, the particular communication resource, may be a future or upcoming communication resource, such as an upcoming downlink slot.

At step 410, based on determining that the level of interference satisfies an interference threshold (such as determined in a manner described with respect to FIG. 3), the UE 415-*a* may determine to request notification of a quantity of transmission layers scheduled to be used by the one or more neighbor network entities 405-*b* (e.g., such as potential interferer network entities) for communication within the communication resource. Accordingly, the UE 415-*a* may transmit, to the serving network entity 405-*a*, a request for notification of a quantity of transmission layers scheduled to be used by the one or more neighbor network entities 405-*b* for communication within the communication resource. In some cases, the request may include an indication of a position or geolocation of the UE 415-*a*. The UE 415-*a* may transmit the request to the serving network entity 405-*a* periodically, aperiodically, or randomly. In some cases, the frequency of transmission of the request may be based on a schedule configured by the serving network entity 405-*a*. The UE 415-*a* may transmit the request via uplink signaling, such as via uplink control information (UCI), a physical uplink control channel (PUCCH), a medium access control-control element (MAC-CE), other uplink control signaling, or any combination thereof.

At step 415, the serving network entity 405-*a* may receive the quantity of transmission layers notification request from the UE 415-*a*, and may transmit the request to the core network entity 430, as the core network entity 430 may have knowledge of and the capability to communicate with the one or more neighbor network entities 405-*b*. In some cases, the request to the core network entity 430 may further indicate the position or location of the requesting UE 415-*a* (for instance, as indicated in the quantity of transmission layers notification request from the UE 415-*a*). In some cases, the request to the core network entity 430 may additionally indicate a level of granularity for reporting the quantity of transmission layers. For example, the level of granularity may indicate that the quantity of transmission layers should be reported per subcarrier, per resource block, per resource element, or based on some other level of granularity. In some cases, the requested level of granularity may depend on a configuration of the serving network entity 405-*a*.

At step 420, the core network entity 430 may receive the quantity of layers notification request from the serving network entity 405-*a*, and may identify one or more candidate network entities that are in proximity to or have a potential to interfere with the serving network entity 405-*a* as the one or more neighbor network entities 405-*b* to transmit a request for an indication of a quantity of transmission layers scheduled to be used for communication within the communication resources. In some cases, the determination may, additionally, or alternatively, be based on a position or geolocation of the requesting UE 415-*a* (for instance, as indicated in the quantity of transmission layers notification request from the UE 415-*a*).

At step 425, the core network entity 430 may transmit to one or more of the identified neighbor network entities 405-*b*, a request to inform the core network entity 430 of a quantity of transmission layers that are scheduled for use by that neighbor network entity 405-*b* for communication within the communication resource. In some cases, the request to the one or more neighbor network entities 405-*b* may be further based on a level of granularity requested by the serving network entity 405, and the core network entity 430 may indicate to the one or more neighbor network entities 405-*b*, the level of granularity requested by the serving network entity 405-*a*. In other cases, instead of the serving network entity 405-*a* indicating a level of granularity for reporting the quantity of transmission layers, the core network entity 430 may determine and indicate to the one or more neighbor network entities 405-*b*, a level of granularity for reporting the quantity of transmission layers. For example, the level of granularity may indicate that the quantity of transmission layers should be reported per subcarrier, per resource block, per resource element, or based on some other level of granularity. In some cases, the requested level of granularity may depend on a configuration of the serving network entity 305-*a*, a configuration of the neighbor network entities 305-*b* and 305-*c*, or a combination thereof.

At step 430, the one or more neighbor network entities 405-*b* may individually determine a quantity of transmission layers that are scheduled to be used by that neighbor network entity 405-*b* for communication within the communication resource.

At step 435, one or more of the neighbor network entities 405-*b* may transmit, to the core network entity 430, an indication of their individual quantity of transmission layers that are scheduled to be used for communication within the communication resources. The reported quantity of transmission layers may be based on the requested level of granularity indicated by the core network entity 430. For example, one or more interfering neighbor network entities 405 may indicate a quantity of transmission number of layers per subcarrier, per resource element, per resource block, or any combination thereof, to the core network entity 430. The core network entity 430 may then sum these quantity of transmission number of layers subcarrier, per resource element, per resource block, or any combination thereof.

At step 440, the core network entity 430 may receive, from one or more of the neighbor network entities 405-*b*, their individual quantity of transmission layers that are scheduled to be used by that neighbor network entity 405-*b* for communication within the communication resources. The core network entity 430 may aggregate the received quantities of transmission layers. For instance, the core network entity 430 may sum the quantities of transmission layers received from those of the one or mor neighbor network entities 405-*b* that reported back to the core network entity 430. The aggregation may further be performed at the requested level of granularity.

At step 445, the core network entity 430 may transmit, to the serving network entity 405-*a*, the aggregated (e.g., summed) quantity of layers scheduled to be used by the one or more neighbor network entities 405-*b* for communication within the communication resource (e.g., the summed number of layers per resource element (RE), per resource block (RB), or both).

At step 450, the serving network entity 405-*a* may transmit, to the UE 415-*a*, a message indicating the quantity of transmission layers scheduled to be used by the one or more neighbor network entities 405-*b*. The quantity of transmission layers may be an aggregated (e.g., sum) quantity of transmission layers. The quantity of transmission layers may additionally be based on the requested level of granularity, such as per subcarrier, per resource element, per resource block, or some other level of granularity. The message including the indication of the quantity of transmission layers from the serving network entity 405-*a* may be transmitted in downlink control signaling, such as downlink control information (DCI), a physical downlink control channel (PDCCH), MAC-CE, other downlink control information, or any combination thereof. In some cases, the message including the indication of the quantity of transmission layers may be or may be included in signaling for a resource allocation of the communication resource. For instance, the signaling may include a scheduling grant allocating the communication resources to the UE 415-*a*. In some cases, the message may be transmitted to the UE 415-*a* prior to receiving signaling including a scheduling grant allocating the communication resources to the UE 415-*a*.

At step 455, the UE 415-*a* may apply the rank-aware channel estimation algorithm (e.g., rank-aware interference rejection algorithm) to mitigate interference at the communication resource. In some cases, the UE 415-*a* may initially determine whether the quantity of transmission layers (e.g., the summed quantity) satisfies a threshold. For instance, the quantity of transmission layers may satisfy the threshold when the quantity of transmission layers is less than a total quantity of receive antennas at the UE 415-*a*. Accordingly, if the quantity of transmission layers satisfies the threshold, the UE 415-*a* may use the rank-aware interference rejection algorithm to improve the noise covariance matrix estimation performed by the UE 415-*a*. For instance, in some cases, to use the rank-aware interference rejection algorithm, the quantity of transmission layers (e.g., the summed quantity of transmission layers) may be applied to the rank-aware channel estimation algorithm (e.g., the rank-aware interference rejection algorithm). The updated rank-aware channel estimation algorithm (e.g., the rank-aware channel estimation algorithm applied with the quantity of transmission layers) may be used to update or improve the noise covariance matrix estimation (e.g., improve $C_{zz}$ estimation) and, subsequently, the updated noise covariance matrix estimation may be used at least in part to perform interference mitigation when receiving a downlink message in the communication resource.

Figure 5:
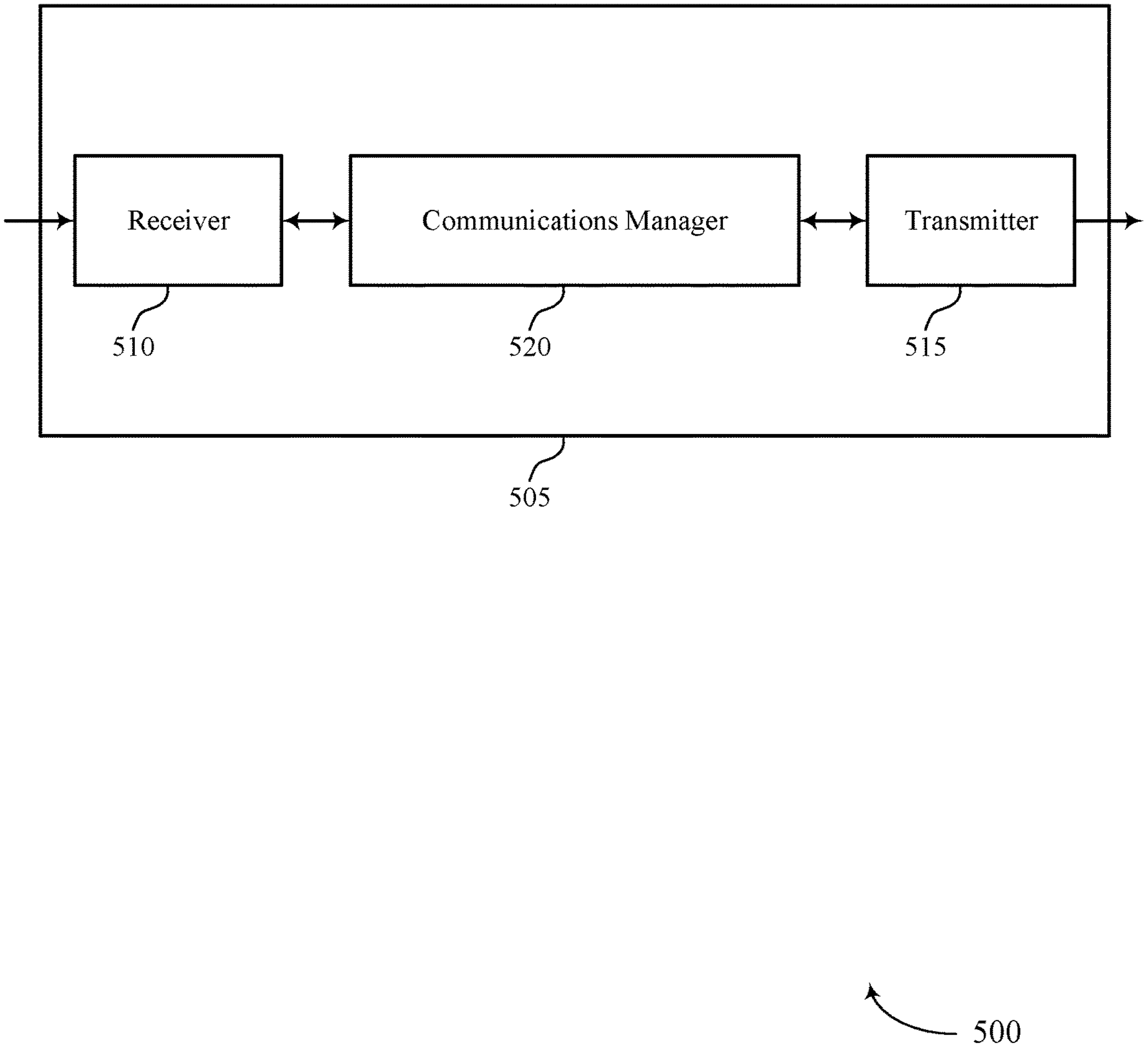
FIGS. 5 and 6 show block diagrams of devices that support techniques for rank-aware interference rejection based on neighbor cell layer notification in accordance with one or more aspects of the present disclosure.

FIG. 5 shows a block diagram 500 of a device 505 that supports techniques for rank-aware interference rejection based on neighbor cell layer notification in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for rank-aware interference rejection based on neighbor cell layer notification). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for rank-aware interference rejection based on neighbor cell layer notification). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for rank-aware interference rejection based on neighbor cell layer notification as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting, to a first network entity serving the UE, a first message requesting a quantity of transmission layers scheduled to be used by one or more neighbor network entities for communication within a communication resource. The communications manager 520 is capable of, configured to, or operable to support a means for receiving, from the first network entity, an indication of the quantity of transmission layers for the communication resource. The communications manager 520 is capable of, configured to, or operable to support a means for receiving, via the communication resource, a downlink message using a rank-aware channel estimation algorithm corresponding to the quantity of transmission layers for the communication resource.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for improved throughput, performance, and communication reliability.

Figure 6:
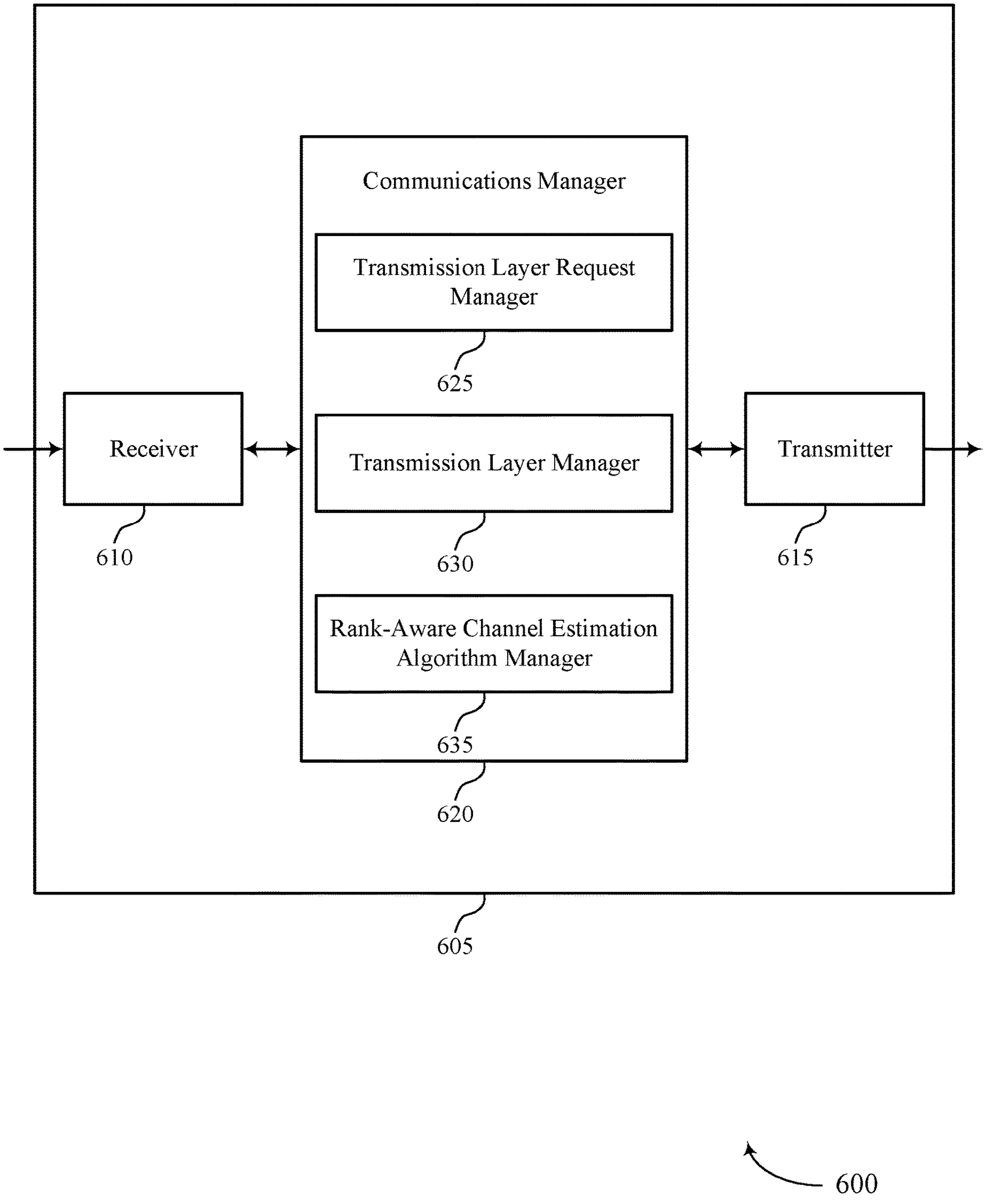

FIG. 6 shows a block diagram 600 of a device 605 that supports techniques for rank-aware interference rejection based on neighbor cell layer notification in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for rank-aware interference rejection based on neighbor cell layer notification). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for rank-aware interference rejection based on neighbor cell layer notification). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for rank-aware interference rejection based on neighbor cell layer notification as described herein. For example, the communications manager 620 may include a transmission layer request manager 625, a transmission layer manager 630, a rank-aware channel estimation algorithm manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The transmission layer request manager 625 is capable of, configured to, or operable to support a means for transmitting, to a first network entity serving the UE, a first message requesting a quantity of transmission layers scheduled to be used by one or more neighbor network entities for communication within a communication resource. The transmission layer manager 630 is capable of, configured to, or operable to support a means for receiving, from the first network entity, an indication of the quantity of transmission layers for the communication resource. The rank-aware channel estimation algorithm manager 635 is capable of, configured to, or operable to support a means for receiving, via the communication resource, a downlink message using a rank-aware channel estimation algorithm corresponding to the quantity of transmission layers for the communication resource.

Figure 7:
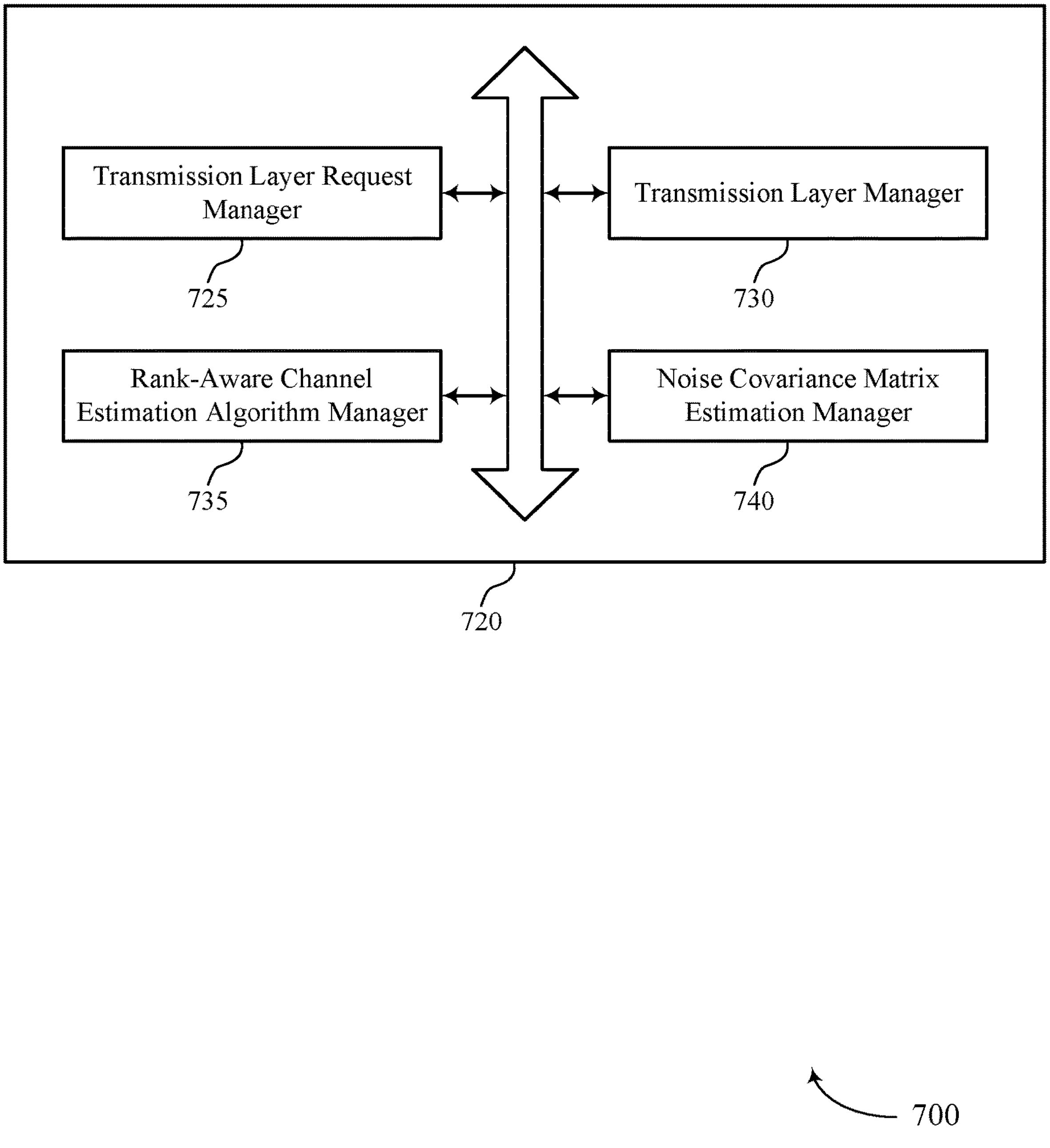
FIG. 7 shows a block diagram of a communications manager that supports techniques for rank-aware interference rejection based on neighbor cell layer notification in accordance with one or more aspects of the present disclosure.

FIG. 7 shows a block diagram 700 of a communications manager 720 that supports techniques for rank-aware interference rejection based on neighbor cell layer notification in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for rank-aware interference rejection based on neighbor cell layer notification as described herein. For example, the communications manager 720 may include a transmission layer request manager 725, a transmission layer manager 730, a rank-aware channel estimation algorithm manager 735, a noise covariance matrix estimation manager 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The transmission layer request manager 725 is capable of, configured to, or operable to support a means for transmitting, to a first network entity serving the UE, a first message requesting a quantity of transmission layers scheduled to be used by one or more neighbor network entities for communication within a communication resource. The transmission layer manager 730 is capable of, configured to, or operable to support a means for receiving, from the first network entity, an indication of the quantity of transmission layers for the communication resource. The rank-aware channel estimation algorithm manager 735 is capable of, configured to, or operable to support a means for receiving, via the communication resource, a downlink message using a rank-aware channel estimation algorithm corresponding to the quantity of transmission layers for the communication resource.

In some examples, the first message is transmitted based on noise covariance matrix estimation for the communication resource satisfying an interference threshold value.

In some examples, the noise covariance matrix estimation manager 740 is capable of, configured to, or operable to support a means for receiving, from the first network entity, control information indicating to perform the noise covariance matrix estimation within the communication resource.

In some examples, the first message includes an indication of a granularity associated with the requested quantity of transmission layers. In some examples, the granularity includes a quantity of transmission layers per resource element, a quantity of transmission layers per resource block, a quantity of transmission layers per slot, or a quantity of transmission layers per subcarrier.

In some examples, the indication of the quantity of transmission layers includes a sum of quantities of transmission layers associated with the one or more neighbor network entities.

In some examples, the indication of the quantity of transmission layers for the communication resource is received via control signaling. In some examples, the control signaling further includes a scheduling grant allocating the communication resource to the UE.

In some examples, the first message is transmitted via a first medium access control-control element (MAC-CE) or a physical uplink control channel. In some examples, the indication of the quantity of transmission layers for the communication resource is received via a second MAC-CE or a physical downlink shared channel.

Figure 8:
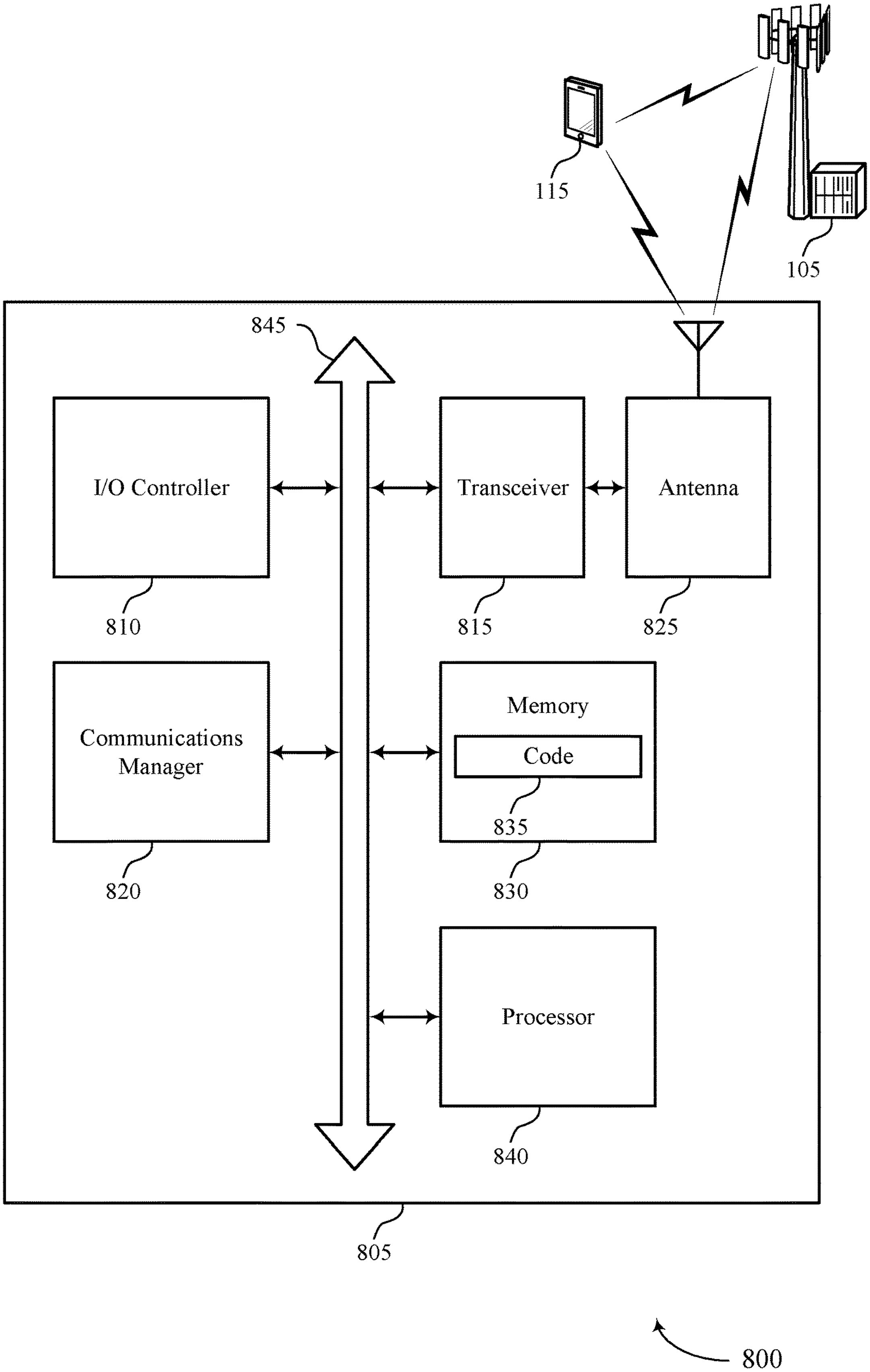
FIG. 8 shows a diagram of a system including a device that supports techniques for rank-aware interference rejection based on neighbor cell layer notification in accordance with one or more aspects of the present disclosure.

FIG. 8 shows a diagram of a system 800 including a device 805 that supports techniques for rank-aware interference rejection based on neighbor cell layer notification in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for rank-aware interference rejection based on neighbor cell layer notification). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for transmitting, to a first network entity serving the UE, a first message requesting a quantity of transmission layers scheduled to be used by one or more neighbor network entities for communication within a communication resource. The communications manager 820 is capable of, configured to, or operable to support a means for receiving, from the first network entity, an indication of the quantity of transmission layers for the communication resource. The communications manager 820 is capable of, configured to, or operable to support a means for receiving, via the communication resource, a downlink message using a rank-aware channel estimation algorithm corresponding to the quantity of transmission layers for the communication resource.

By including or configuring the communications manager 820 in accordance with examples as described herein, the device 805 may support techniques for improved throughput, performance, and communication reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for rank-aware interference rejection based on neighbor cell layer notification as described herein, or the at least one processor 840 and the at least one memory 830 may be otherwise configured to, individually or collectively, perform or support such operations.

Figure 9:
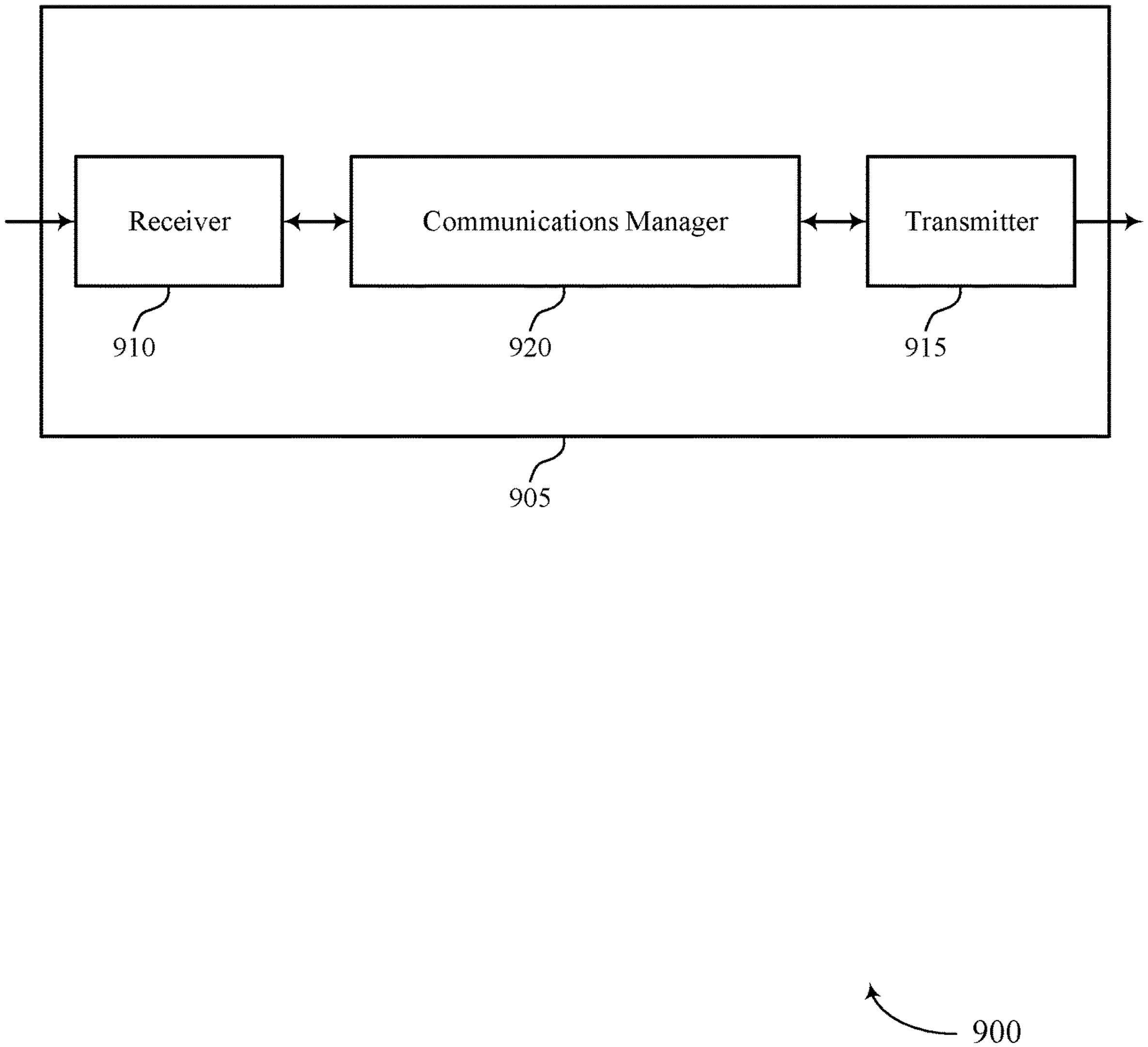
FIGS. 9 and 10 show block diagrams of devices that support techniques for rank-aware interference rejection based on neighbor cell layer notification in accordance with one or more aspects of the present disclosure.

FIG. 9 shows a block diagram 900 of a device 905 that supports techniques for rank-aware interference rejection based on neighbor cell layer notification in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for rank-aware interference rejection based on neighbor cell layer notification as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving, from a UE served by the first network entity, a first message requesting a quantity of transmission layers scheduled to be used by one or more neighbor network entities for communication within a communication resource. The communications manager 920 is capable of, configured to, or operable to support a means for transmitting, to a second network entity, a second message requesting the quantity of transmission layers for the communication resource. The communications manager 920 is capable of, configured to, or operable to support a means for receiving, from the second network entity, a third message including an indication of the quantity of transmission layers for the communication resource. The communications manager 920 is capable of, configured to, or operable to support a means for transmitting, to the UE, the indication of the quantity of transmission layers for the communication resource.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for improved throughput, performance, and communication reliability.

Figure 10:
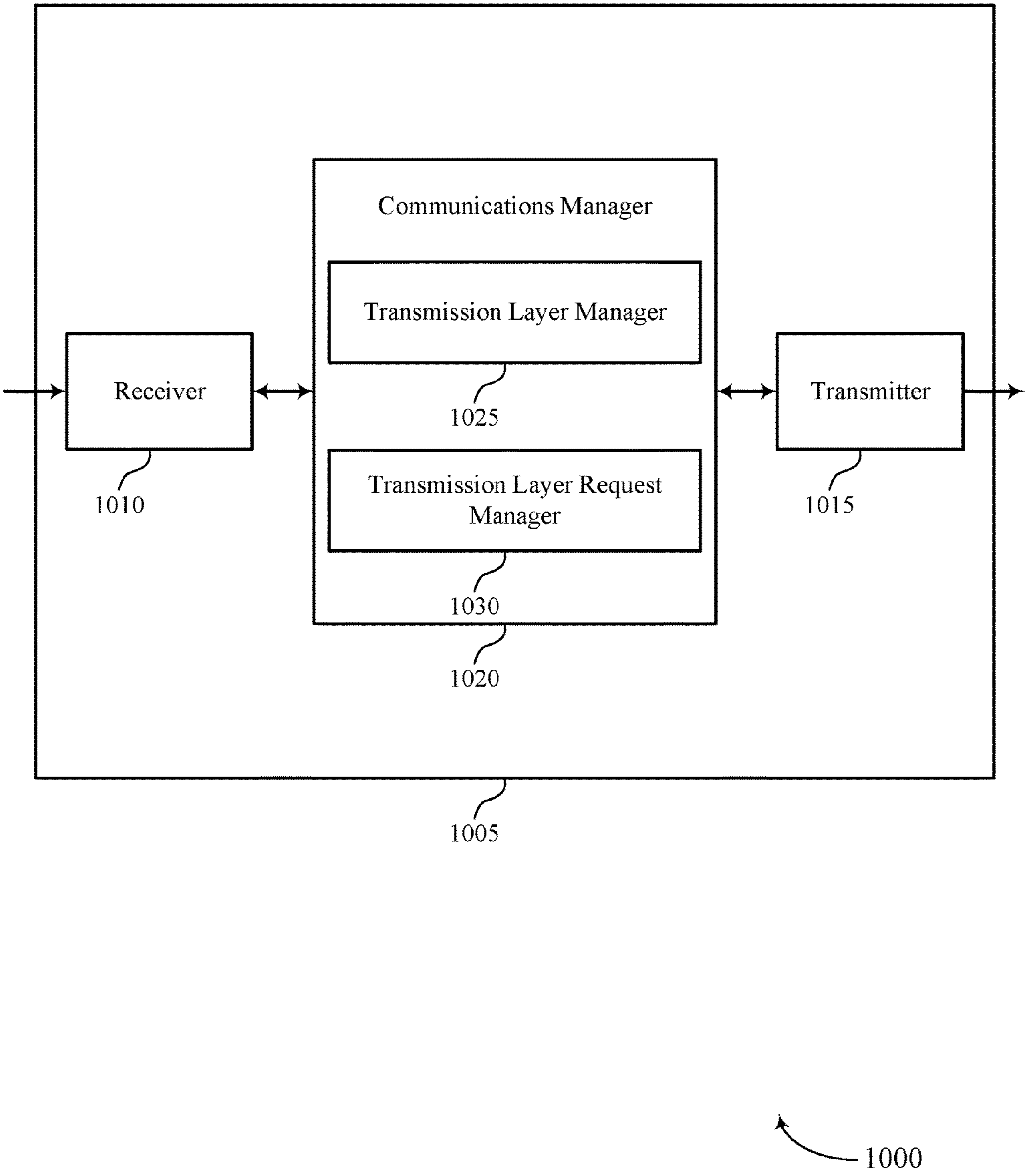

FIG. 10 shows a block diagram 1000 of a device 1005 that supports techniques for rank-aware interference rejection based on neighbor cell layer notification in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for rank-aware interference rejection based on neighbor cell layer notification as described herein. For example, the communications manager 1020 may include a transmission layer manager 1025 a transmission layer request manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The transmission layer manager 1025 is capable of, configured to, or operable to support a means for receiving, from a UE served by the first network entity, a first message requesting a quantity of transmission layers scheduled to be used by one or more neighbor network entities for communication within a communication resource. The transmission layer request manager 1030 is capable of, configured to, or operable to support a means for transmitting, to a second network entity, a second message requesting the quantity of transmission layers for the communication resource. The transmission layer manager 1025 is capable of, configured to, or operable to support a means for receiving, from the second network entity, a third message including an indication of the quantity of transmission layers for the communication resource. The transmission layer manager 1025 is capable of, configured to, or operable to support a means for transmitting, to the UE, the indication of the quantity of transmission layers for the communication resource.

Figure 11:
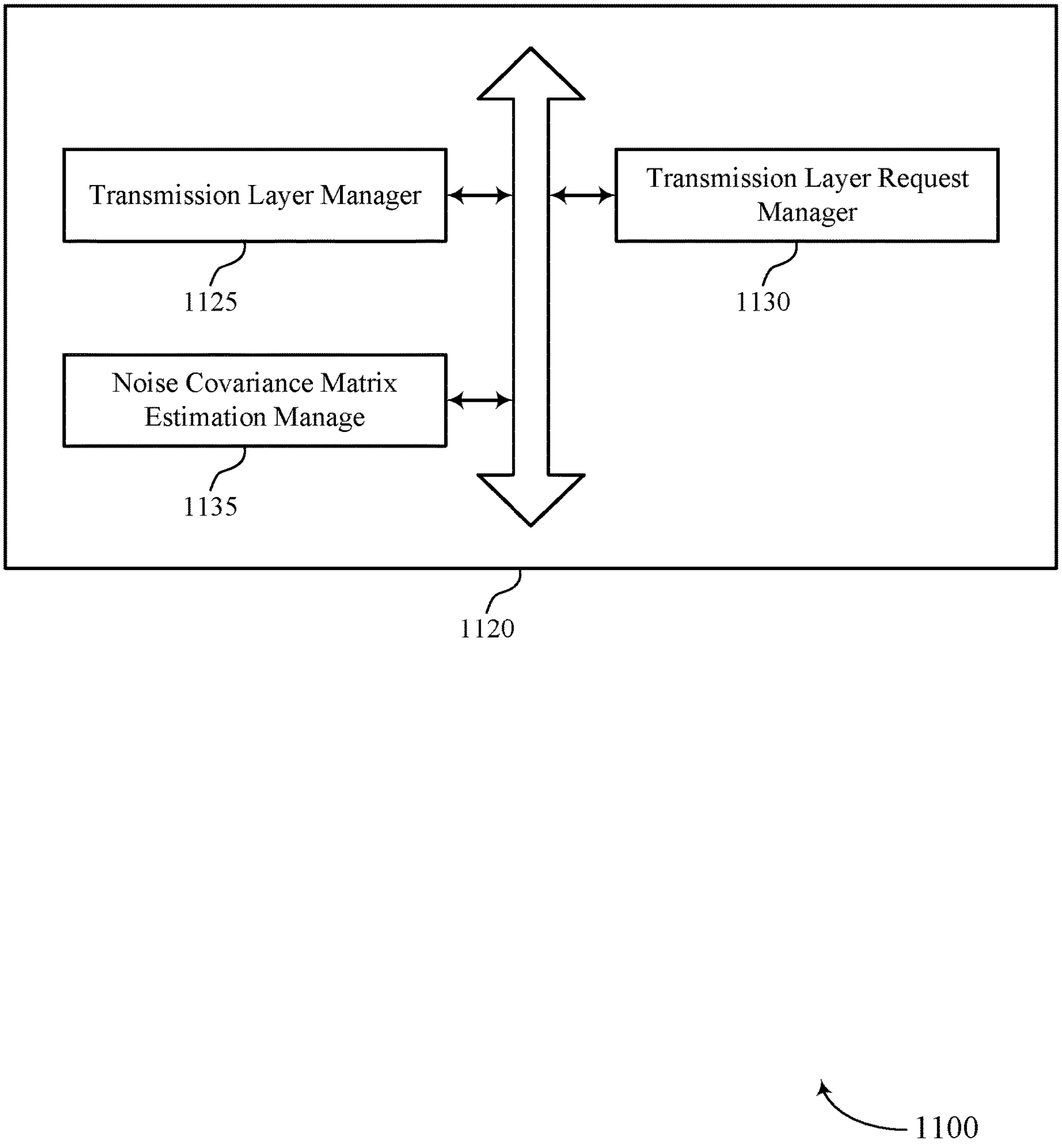
FIG. 11 shows a block diagram of a communications manager that supports techniques for rank-aware interference rejection based on neighbor cell layer notification in accordance with one or more aspects of the present disclosure.

FIG. 11 shows a block diagram 1100 of a communications manager 1120 that supports techniques for rank-aware interference rejection based on neighbor cell layer notification in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for rank-aware interference rejection based on neighbor cell layer notification as described herein. For example, the communications manager 1120 may include a transmission layer manager 1125, a transmission layer request manager 1130, a noise covariance matrix estimation manage 1135, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The transmission layer manager 1125 is capable of, configured to, or operable to support a means for receiving, from a UE served by the first network entity, a first message requesting a quantity of transmission layers scheduled to be used by one or more neighbor network entities for communication within a communication resource. The transmission layer request manager 1130 is capable of, configured to, or operable to support a means for transmitting, to a second network entity, a second message requesting the quantity of transmission layers for the communication resource. In some examples, the transmission layer manager 1125 is capable of, configured to, or operable to support a means for receiving, from the second network entity, a third message including an indication of the quantity of transmission layers for the communication resource. In some examples, the transmission layer manager 1125 is capable of, configured to, or operable to support a means for transmitting, to the UE, the indication of the quantity of transmission layers for the communication resource.

In some examples, the first message includes an indication of a granularity associated with the requested quantity of transmission layers. In some examples, the granularity includes a quantity of transmission layers per resource element, a quantity of transmission layers per resource block, a quantity of transmission layers per slot, or a quantity of transmission layers per subcarrier.

In some examples, the indication of the quantity of transmission layers is based on the indicated granularity.

In some examples, the noise covariance matrix estimation manage 1135 is capable of, configured to, or operable to support a means for transmitting, to the UE, control information indicating to perform noise covariance matrix estimation for the communication resource.

In some examples, the indication of the quantity of transmission layers for the communication resource is transmitted to the UE via control signaling. In some examples, the control signaling further includes a scheduling grant allocating the communication resource to the UE.

In some examples, the first network entity includes a serving gNodeB (gNB) serving the UE, the one or more neighbor network entities include one or more interferer gNBs, and the second network entity includes a core network entity serving a set of multiple gNBs, the set of multiple gNBs including the serving gNB and the one or more interferer gNBs.

In some examples, the first message requesting the quantity of transmission layers includes information identifying an estimated geolocation of the UE.

In some examples, the first message is received via a first medium access control-control element (MAC-CE) or a physical uplink control channel. In some examples, the indication of the quantity of transmission layers for the communication resource is transmitted via a second MAC-CE or a physical downlink shared channel.

Figure 12:
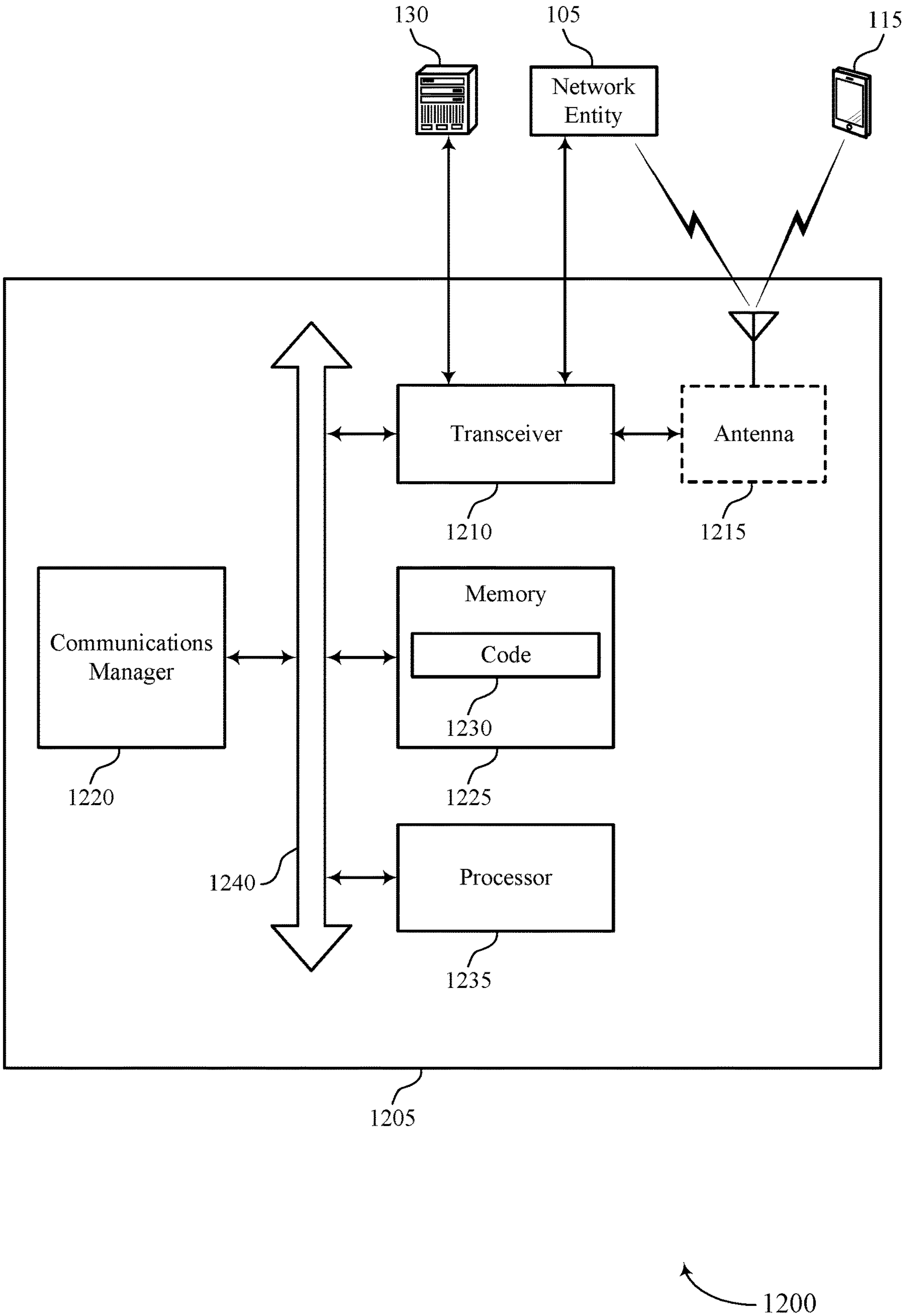
FIG. 12 shows a diagram of a system including a device that supports techniques for rank-aware interference rejection based on neighbor cell layer notification in accordance with one or more aspects of the present disclosure.

FIG. 12 shows a diagram of a system 1200 including a device 1205 that supports techniques for rank-aware interference rejection based on neighbor cell layer notification in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting techniques for rank-aware interference rejection based on neighbor cell layer notification). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for receiving, from a UE served by the first network entity, a first message requesting a quantity of transmission layers scheduled to be used by one or more neighbor network entities for communication within a communication resource. The communications manager 1220 is capable of, configured to, or operable to support a means for transmitting, to a second network entity, a second message requesting the quantity of transmission layers for the communication resource. The communications manager 1220 is capable of, configured to, or operable to support a means for receiving, from the second network entity, a third message including an indication of the quantity of transmission layers for the communication resource. The communications manager 1220 is capable of, configured to, or operable to support a means for transmitting, to the UE, the indication of the quantity of transmission layers for the communication resource.

By including or configuring the communications manager 1220 in accordance with examples as described herein, the device 1205 may support techniques for improved throughput, performance, and communication reliability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of techniques for rank-aware interference rejection based on neighbor cell layer notification as described herein, or the at least one processor 1235 and the at least one memory 1225 may be otherwise configured to, individually or collectively, perform or support such operations.

Figure 13:
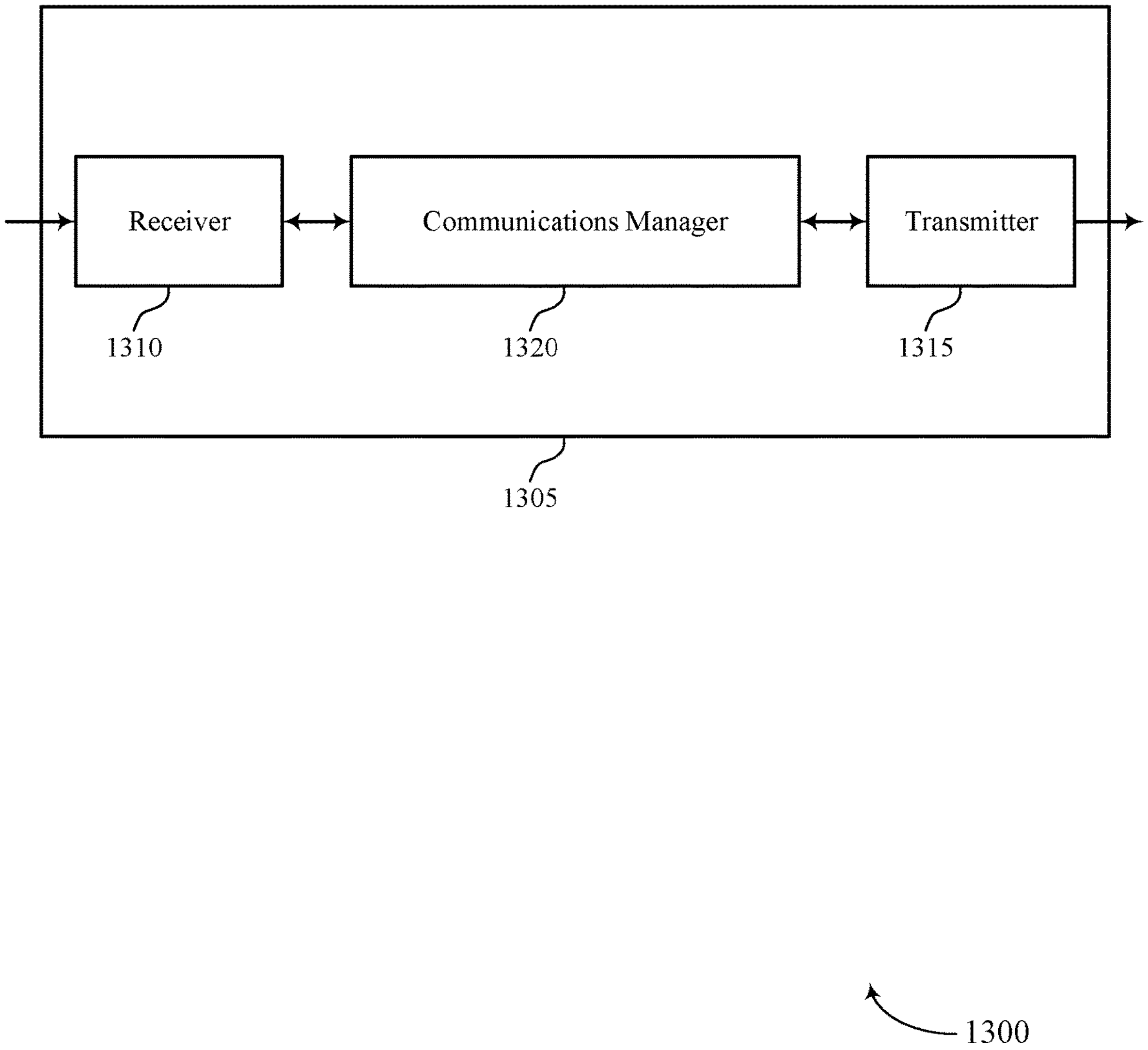
FIGS. 13 and 14 show block diagrams of devices that support techniques for rank-aware interference rejection based on neighbor cell layer notification in accordance with one or more aspects of the present disclosure.

FIG. 13 shows a block diagram 1300 of a device 1305 that supports techniques for rank-aware interference rejection based on neighbor cell layer notification in accordance with one or more aspects of the present disclosure. The device 1305 may be an example of aspects of a core network entity as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for rank-aware interference rejection based on neighbor cell layer notification as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. For example, the communications manager 1320 is capable of, configured to, or operable to support a means for receiving, from a first network entity, a message requesting a quantity of transmission layers scheduled to be used by one or more neighbor network entities for communication within a communication resource. The communications manager 1320 is capable of, configured to, or operable to support a means for requesting, from at least one neighbor network entity of the one or more neighbor network entities, a quantity of transmission layers scheduled to be used by the at least one neighbor network entity for communication within the communication resource. The communications manager 1320 is capable of, configured to, or operable to support a means for transmitting, to the first network entity, an indication of the quantity of transmission layers scheduled to be used by the at least one neighbor network entity for communication within the communication resource.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for improved throughput, performance, and communication reliability.

Figure 14:
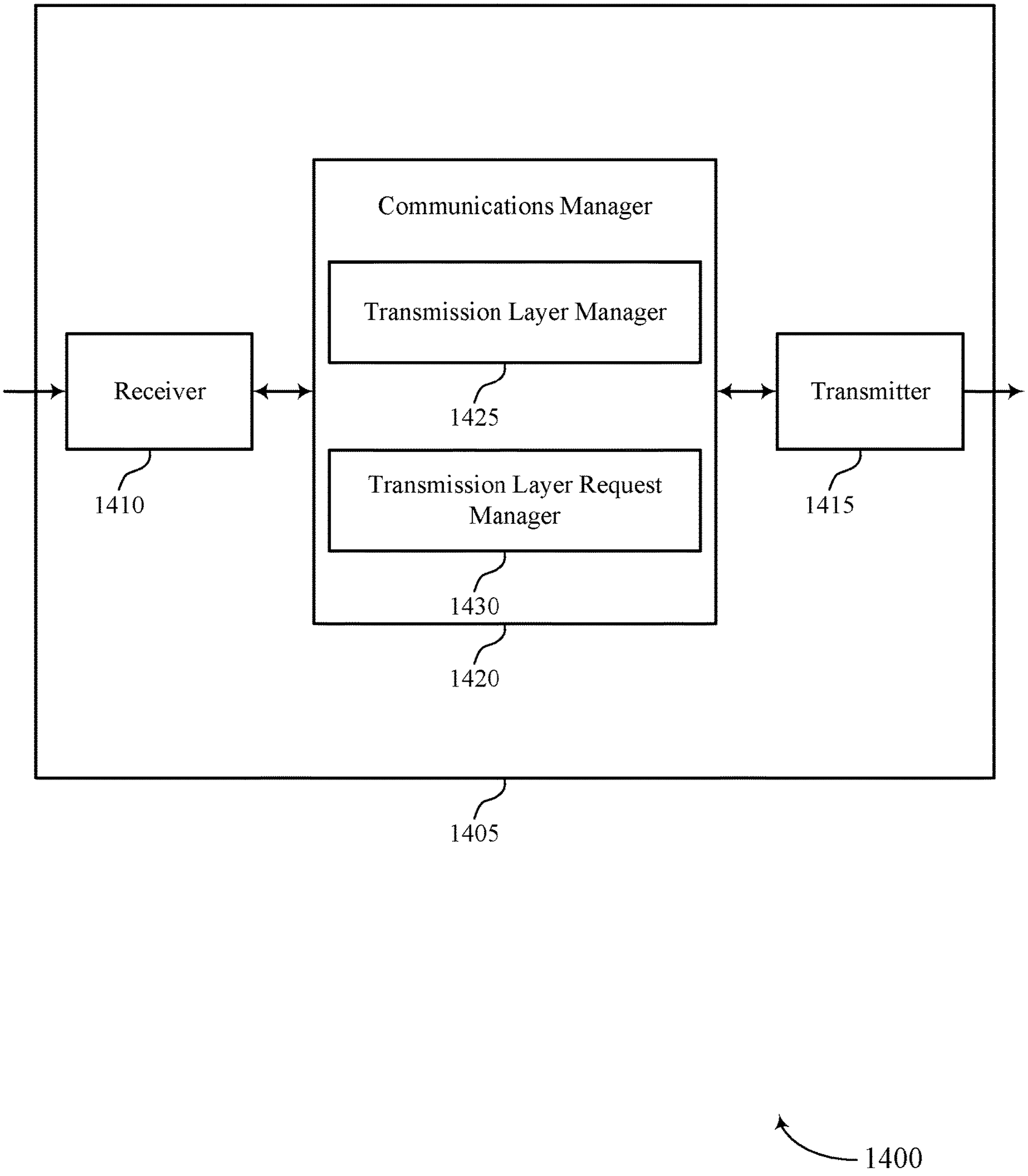

FIG. 14 shows a block diagram 1400 of a device 1405 that supports techniques for rank-aware interference rejection based on neighbor cell layer notification in accordance with one or more aspects of the present disclosure. The device 1405 may be an example of aspects of a device 1305 or a core network 130 as described herein. The device 1405 may include a receiver 1410, a transmitter 1415, and a communications manager 1420. The device 1405, or one of more components of the device 1405 (e.g., the receiver 1410, the transmitter 1415, and the communications manager 1420), may include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for rank-aware interference rejection based on neighbor cell layer notification as described herein. For example, the communications manager 1420 may include a transmission layer manager 1425 a transmission layer request manager 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The transmission layer manager 1425 is capable of, configured to, or operable to support a means for receiving, from a first network entity, a message requesting a quantity of transmission layers scheduled to be used by one or more neighbor network entities for communication within a communication resource. The transmission layer request manager 1430 is capable of, configured to, or operable to support a means for requesting, from at least one neighbor network entity of the one or more neighbor network entities, a quantity of transmission layers scheduled to be used by the at least one neighbor network entity for communication within the communication resource. The transmission layer manager 1425 is capable of, configured to, or operable to support a means for transmitting, to the first network entity, an indication of the quantity of transmission layers scheduled to be used by the at least one neighbor network entity for communication within the communication resource.

Figure 15:
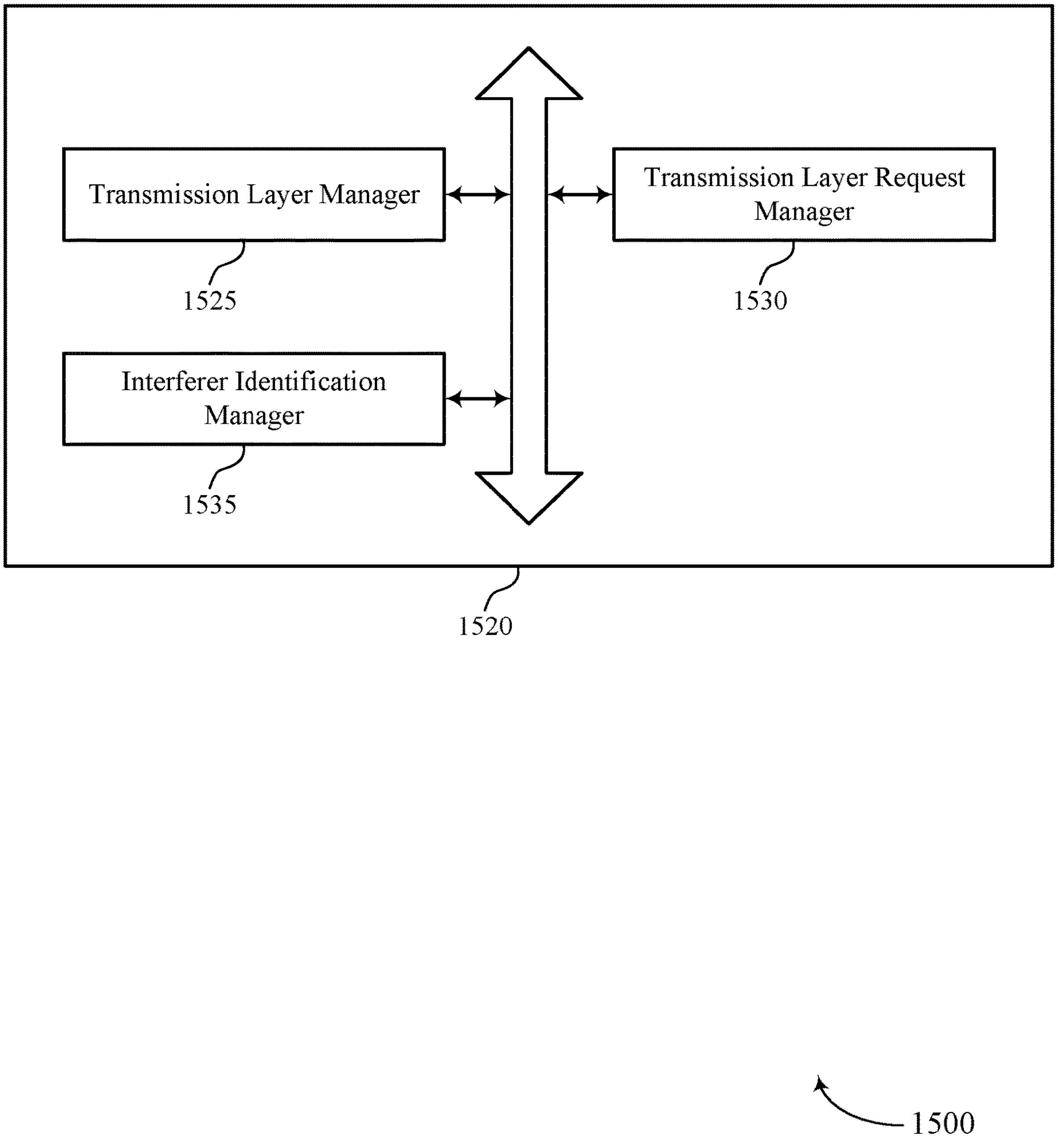
FIG. 15 shows a block diagram of a communications manager that supports techniques for rank-aware interference rejection based on neighbor cell layer notification in accordance with one or more aspects of the present disclosure.

FIG. 15 shows a block diagram 1500 of a communications manager 1520 that supports techniques for rank-aware interference rejection based on neighbor cell layer notification in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for rank-aware interference rejection based on neighbor cell layer notification as described herein.

For example, the communications manager 1520 may include a transmission layer manager 1525, a transmission layer request manager 1530, an interferer identification manager 1535, or any combination thereof. Each of these components, or components or subcomponents thereof (e.g., one or more processors, one or more memories), may communicate, directly or indirectly, with one another (e.g., via one or more buses).

The communications manager 1520 may support wireless communications in accordance with examples as disclosed herein. The transmission layer manager 1525 is capable of, configured to, or operable to support a means for receiving, from a first network entity, a message requesting a quantity of transmission layers scheduled to be used by one or more neighbor network entities for communication within a communication resource. The transmission layer request manager 1530 is capable of, configured to, or operable to support a means for requesting, from at least one neighbor network entity of the one or more neighbor network entities, a quantity of transmission layers scheduled to be used by the at least one neighbor network entity for communication within the communication resource. In some examples, the transmission layer manager 1525 is capable of, configured to, or operable to support a means for transmitting, to the first network entity, an indication of the quantity of transmission layers scheduled to be used by the at least one neighbor network entity for communication within the communication resource.

In some examples, the message requesting the quantity of transmission layers includes information identifying an estimated geolocation of a UE served by the first network entity.

In some examples, the interferer identification manager 1535 is capable of, configured to, or operable to support a means for identifying the one or more neighbor network entities by determining one or more candidate network entities having a potential to interfere with the first network entity.

In some examples, determining the one or more candidate network entities is based on an estimated geolocation of a UE requesting the quantity of transmission layers.

In some examples, the first network entity includes a serving gNodeB (gNB) serving a UE requesting the quantity of transmission layers, the one or more neighbor network entities include one or more interferer gNBs, and the second network entity includes a core network entity serving a set of multiple gNBs, the set of multiple gNBs including the serving gNB and the one or more interferer gNBs.

Figure 16:
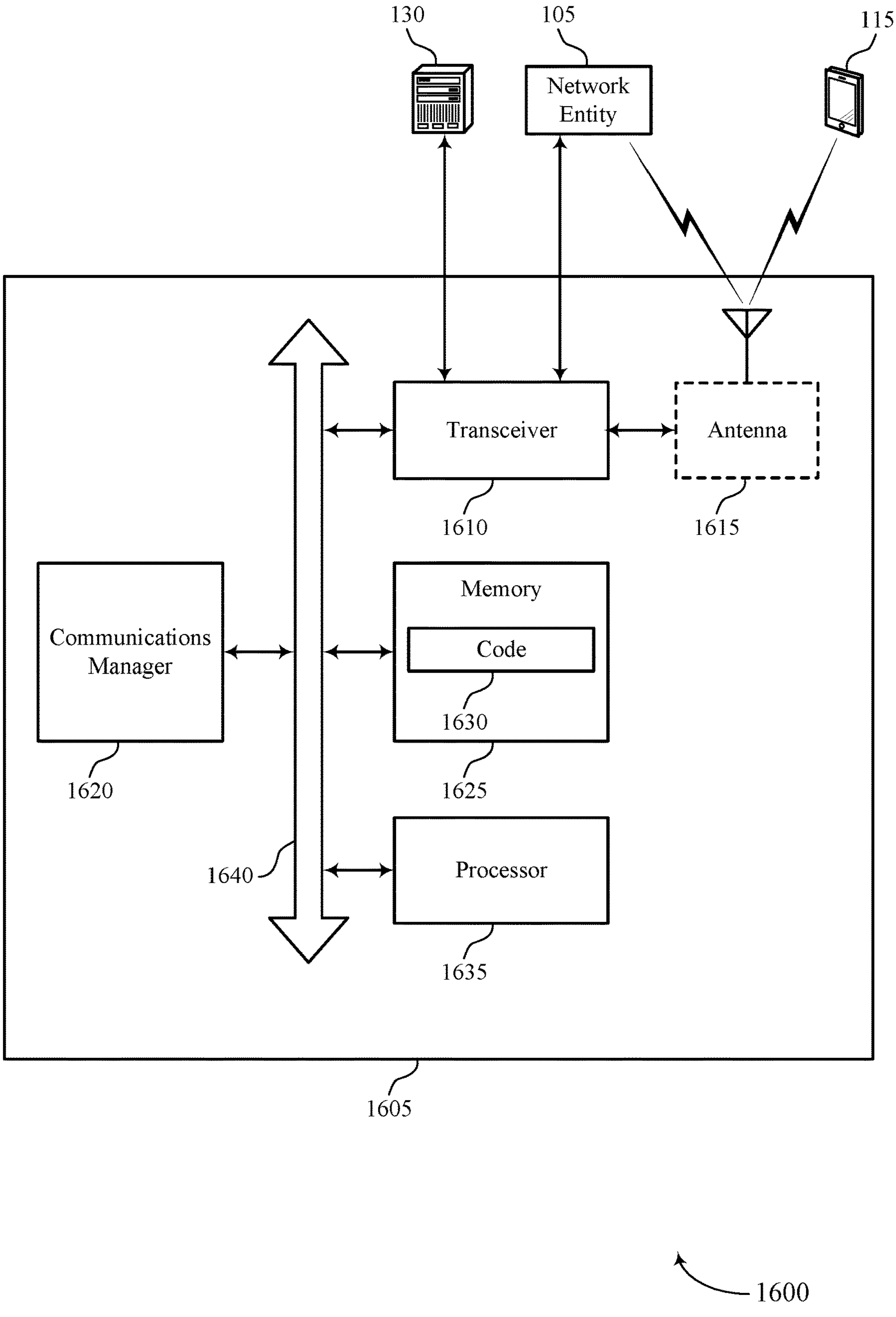
FIG. 16 shows a diagram of a system including a device that supports techniques for rank-aware interference rejection based on neighbor cell layer notification in accordance with one or more aspects of the present disclosure.

FIG. 16 shows a diagram of a system 1600 including a device 1605 that supports techniques for rank-aware interference rejection based on neighbor cell layer notification in accordance with one or more aspects of the present disclosure. The device 1605 may be an example of or include the components of a device 1305, a device 1405, or a core network entity as described herein. The device 1605 may include components for bi-directional voice and data communications including components for transmitting and receiving communications, such as a communications manager 1620, a transceiver 1610, an antenna 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting techniques for rank-aware interference rejection based on neighbor cell layer notification). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some examples, the at least one processor 1635 may include multiple processors and the at least one memory 1625 may include multiple memories. One or more of the multiple processors may be coupled with one or more of the multiple memories, which may, individually or collectively, be configured to perform various functions herein. In some examples, the at least one processor 1635 may be a component of a processing system, which may refer to a system (such as a series) of machines, circuitry (including, for example, one or both of processor circuitry (which may include the at least one processor 1635) and memory circuitry (which may include the at least one memory 1625)), or components, that receives or obtains inputs and processes the inputs to produce, generate, or obtain a set of outputs. The processing system may be configured to perform one or more of the functions described herein. As such, the at least one processor 1635 or a processing system including the at least one processor 1635 may be configured to, configurable to, or operable to cause the device 1605 to perform one or more of the functions described herein. Further, as described herein, being "configured to," being "configurable to," and being "operable to" may be used interchangeably and may be associated with a capability, when executing code stored in the at least one memory 1625 or otherwise, to perform one or more of the functions described herein.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications in accordance with examples as disclosed herein. For example, the communications manager 1620 is capable of, configured to, or operable to support a means for receiving, from a first network entity, a message requesting a quantity of transmission layers scheduled to be used by one or more neighbor network entities for communication within a communication resource. The communications manager 1620 is capable of, configured to, or operable to support a means for requesting, from at least one neighbor network entity of the one or more neighbor network entities, a quantity of transmission layers scheduled to be used by the at least one neighbor network entity for communication within the communication resource. The communications manager 1620 is capable of, configured to, or operable to support a means for transmitting, to the first network entity, an indication of the quantity of transmission layers scheduled to be used by the at least one neighbor network entity for communication within the communication resource.

By including or configuring the communications manager 1620 in accordance with examples as described herein, the device 1605 may support techniques for improved throughput, performance, and communication reliability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of techniques for rank-aware interference rejection based on neighbor cell layer notification as described herein, or the at least one processor 1635 and the at least one memory 1625 may be otherwise configured to, individually or collectively, perform or support such operations.

Figure 17:
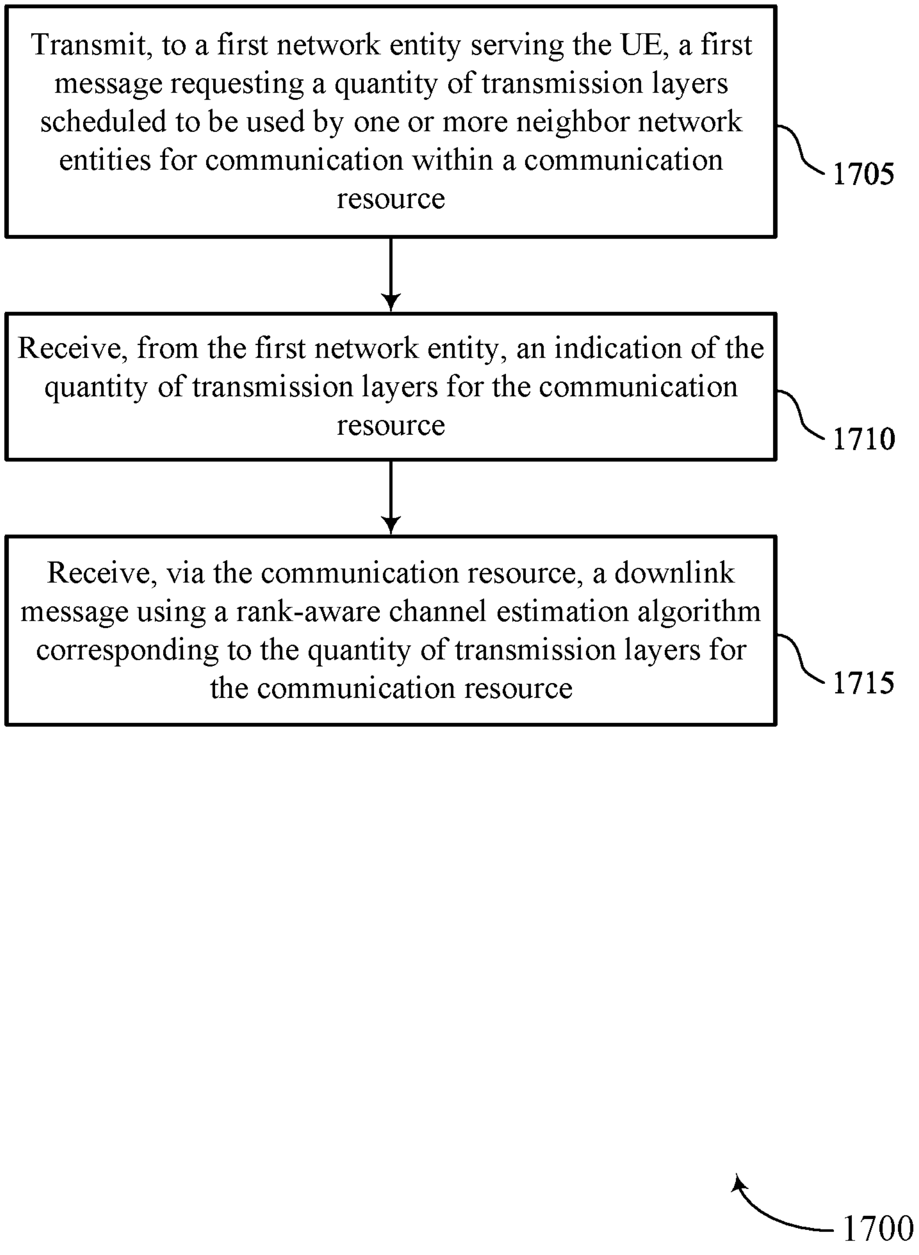
FIGS. 17 through 19 show flowcharts illustrating methods that support techniques for rank-aware interference rejection based on neighbor cell layer notification in accordance with one or more aspects of the present disclosure.

FIG. 17 shows a flowchart illustrating a method 1700 that supports techniques for rank-aware interference rejection based on neighbor cell layer notification in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1705, the method may include transmitting, to a first network entity serving the UE, a first message requesting a quantity of transmission layers scheduled to be used by one or more neighbor network entities for communication within a communication resource. The operations of block 1705 may be performed in accordance with examples as disclosed herein. In some examples, aspects of the operations of 1705 may be performed by a transmission layer request manager 725 as described with reference to FIG. 7.

At 1710, the method may include receiving, from the first network entity, an indication of the quantity of transmission layers for the communication resource. The operations of block 1710 may be performed in accordance with examples as disclosed herein. In some examples, aspects of the operations of 1710 may be performed by a transmission layer manager 730 as described with reference to FIG. 7.

At 1715, the method may include receiving, via the communication resource, a downlink message using a rank-aware channel estimation algorithm corresponding to the quantity of transmission layers for the communication resource. The operations of block 1715 may be performed in accordance with examples as disclosed herein. In some examples, aspects of the operations of 1715 may be performed by a rank-aware channel estimation algorithm manager 735 as described with reference to FIG. 7.

Figure 18:
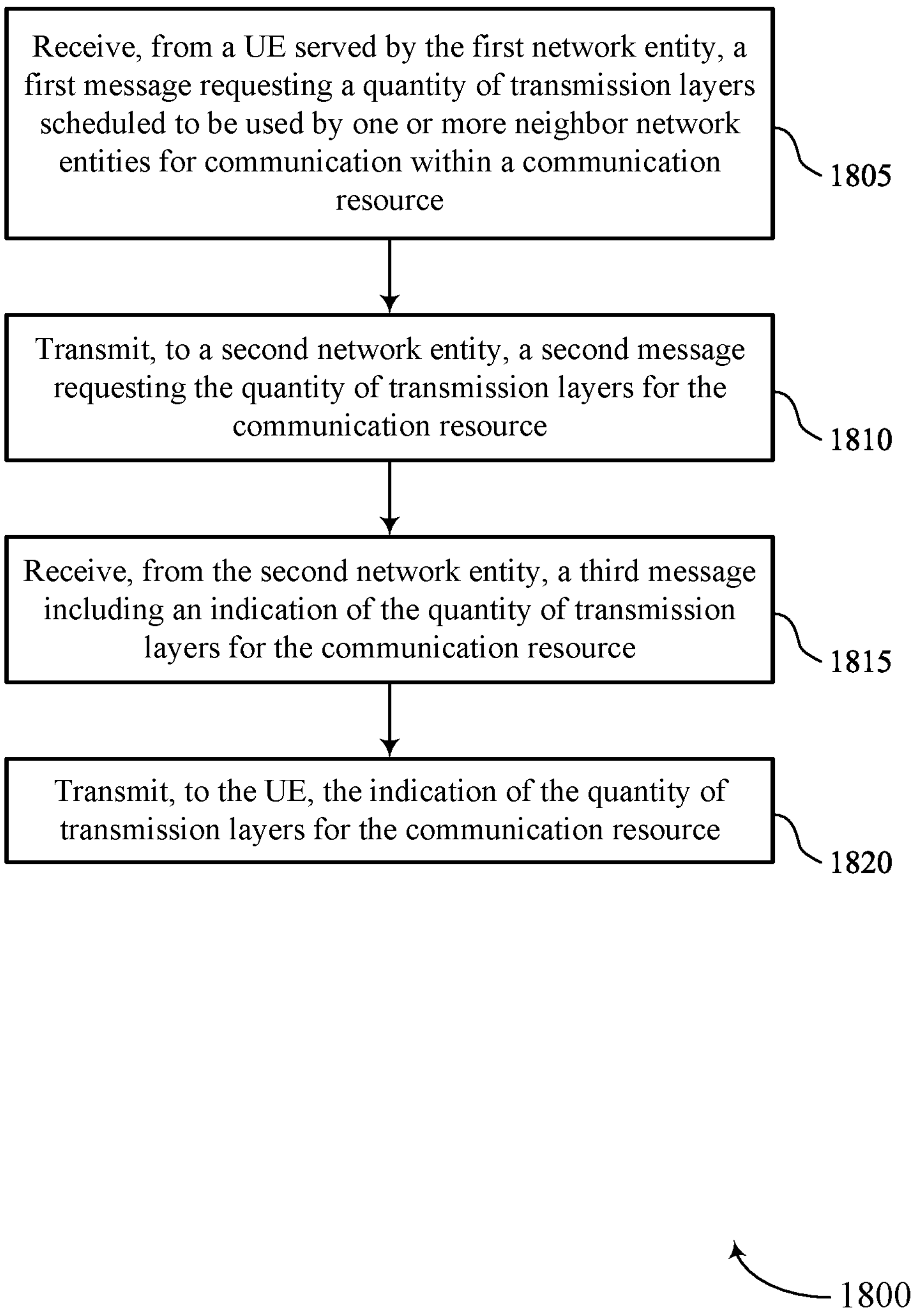

FIG. 18 shows a flowchart illustrating a method 1800 that supports techniques for rank-aware interference rejection based on neighbor cell layer notification in accordance with aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a UE served by the first network entity, a first message requesting a quantity of transmission layers scheduled to be used by one or more neighbor network entities for communication within a communication resource. The operations of block 1805 may be performed in accordance with examples as disclosed herein. In some examples, aspects of the operations of 1805 may be performed by a transmission layer manager 1125 as described with reference to FIG. 11.

At 1810, the method may include transmitting, to a second network entity, a second message requesting the quantity of transmission layers for the communication resource. The operations of block 1810 may be performed in accordance with examples as disclosed herein. In some examples, aspects of the operations of 1810 may be performed by a transmission layer request manager 1130 as described with reference to FIG. 11.

At 1815, the method may include receiving, from the second network entity, a third message including an indication of the quantity of transmission layers for the communication resource. The operations of block 1815 may be performed in accordance with examples as disclosed herein. In some examples, aspects of the operations of 1815 may be performed by a transmission layer manager 1125 as described with reference to FIG. 11.

At 1820, the method may include transmitting, to the UE, the indication of the quantity of transmission layers for the communication resource. The operations of block 1820 may be performed in accordance with examples as disclosed herein. In some examples, aspects of the operations of 1820 may be performed by a transmission layer manager 1125 as described with reference to FIG. 11.

Figure 19:
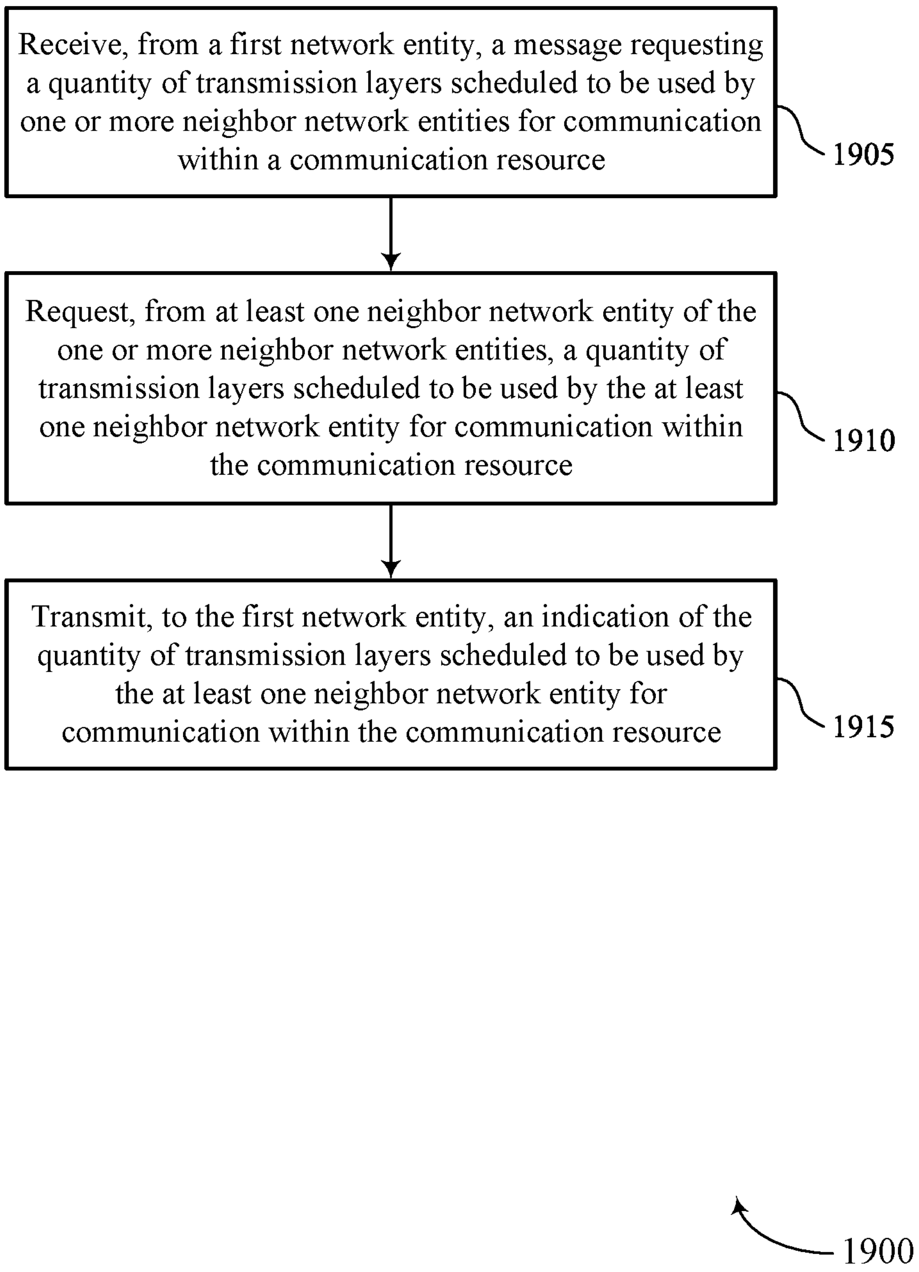

FIG. 19 shows a flowchart illustrating a method 1900 that supports techniques for rank-aware interference rejection based on neighbor cell layer notification in accordance with aspects of the present disclosure. The operations of the method 1900 may be implemented by a core network entity or its components as described herein. For example, the operations of the method 1900 may be performed by a core network entity as described with reference to FIGS. 1 through 4 and 13 through 16. In some examples, a core network entity may execute a set of instructions to control the functional elements of the core network entity to perform the described functions. Additionally, or alternatively, the core network entity may perform aspects of the described functions using special-purpose hardware.

At 1905, the method may include receiving, from a first network entity, a message requesting a quantity of transmission layers scheduled to be used by one or more neighbor network entities for communication within a communication resource. The operations of block 1905 may be performed in accordance with examples as disclosed herein. In some examples, aspects of the operations of 1905 may be performed by a transmission layer manager 1525 as described with reference to FIG. 15.

At 1910, the method may include requesting, from at least one neighbor network entity of the one or more neighbor network entities, a quantity of transmission layers scheduled to be used by the at least one neighbor network entity for communication within the communication resource. The operations of block 1910 may be performed in accordance with examples as disclosed herein. In some examples, aspects of the operations of 1910 may be performed by a transmission layer request manager 1530 as described with reference to FIG. 15.

At 1915, the method may include transmitting, to the first network entity, an indication of the quantity of transmission layers scheduled to be used by the at least one neighbor network entity for communication within the communication resource. The operations of block 1915 may be performed in accordance with examples as disclosed herein. In some examples, aspects of the operations of 1915 may be performed by a transmission layer manager 1525 as described with reference to FIG. 15.

The following provides an overview of aspects of the present disclosure:

Aspect 1: A method for wireless communications by a UE, comprising: transmitting, to a first network entity serving the UE, a first message including a request for a quantity of transmission layers scheduled to be used by one or more neighbor network entities for communication within a communication resource; receiving, from the first network entity, an indication of the quantity of transmission layers for the communication resource; and receiving, via the communication resource, a downlink message using a rank-aware channel estimation algorithm corresponding to the quantity of transmission layers for the communication resource.

Aspect 2: The method of aspect 1, wherein the first message is transmitted based at least in part on noise covariance matrix estimation for the communication resource satisfying an interference threshold value.

Aspect 3: The method of aspect 2, further comprising: receiving, from the first network entity, control information including an indication to perform the noise covariance matrix estimation within the communication resource.

Aspect 4: The method of any of aspects 1 through 3, wherein the first message comprises an indication of a granularity associated with the quantity of transmission layers, and the granularity comprises a quantity of transmission layers per resource element, a quantity of transmission layers per resource block, a quantity of transmission layers per slot, or a quantity of transmission layers per subcarrier.

Aspect 5: The method of any of aspects 1 through 4, wherein the indication of the quantity of transmission layers comprises a sum of quantities of transmission layers associated with the one or more neighbor network entities.

Aspect 6: The method of any of aspects 1 through 5, wherein the indication of the quantity of transmission layers for the communication resource is received via control signaling, and the control signaling further comprises a scheduling grant that allocates the communication resource to the UE.

Aspect 7: The method of any of aspects 1 through 6, wherein the first message is transmitted via a first medium access control-control element (MAC-CE) or a PUCCH, and the indication of the quantity of transmission layers for the communication resource is received via a second medium access control-control element (MAC-CE) or a PDCCH.

Aspect 8: A method for wireless communications by a first network entity, comprising: receiving, from a UE served by the first network entity, a first message including a request for a quantity of transmission layers scheduled to be used by one or more neighbor network entities for communication within a communication resource; transmitting, to a second network entity, a second message including a request for the quantity of transmission layers for the communication resource; receiving, from the second network entity, a third message comprising an indication of the quantity of transmission layers for the communication resource; and transmitting, to the UE, the indication of the quantity of transmission layers for the communication resource.

Aspect 9: The method of aspect 8, wherein the first message comprises an indication of a granularity associated with the quantity of transmission layers, and the granularity comprises a quantity of transmission layers per resource element, a quantity of transmission layers per resource block, a quantity of transmission layers per slot, or a quantity of transmission layers per subcarrier.

Aspect 10: The method of aspect 9, wherein the indication of the quantity of transmission layers is based at least in part on the indicated granularity.

Aspect 11: The method of any of aspects 8 through 10, further comprising: transmitting, to the UE, control information including an indication to perform noise covariance matrix estimation for the communication resource.

Aspect 12: The method of any of aspects 8 through 11, wherein the indication of the quantity of transmission layers for the communication resource is transmitted to the UE via control signaling, and the control signaling further comprises a scheduling grant that allocates the communication resource to the UE.

Aspect 13: The method of any of aspects 8 through 12, wherein the first network entity comprises a serving gNodeB (gNB) serving the UE, the one or more neighbor network entities comprise one or more interferer gNBs, and the second network entity comprises a core network entity serving a plurality of gNBs, the plurality of gNBs comprising the serving gNB and the one or more interferer gNBs.

Aspect 14: The method of any of aspects 8 through 13, wherein the first message includes information indicating an estimated geolocation of the UE.

Aspect 15: The method of any of aspects 8 through 14, wherein the first message is received via a first medium access control-control element (MAC-CE) or a PUCCH, and the indication of the quantity of transmission layers for the communication resource is transmitted via a second medium access control-control element (MAC-CE) or a PDCCH.

Aspect 16: A method for wireless communications by a second network entity, comprising: receiving, from a first network entity, a message including a request for a quantity of transmission layers scheduled to be used by one or more neighbor network entities for communication within a communication resource; including a request for, from at least one neighbor network entity of the one or more neighbor network entities, a quantity of transmission layers scheduled to be used by the at least one neighbor network entity for communication within the communication resource; and transmitting, to the first network entity, an indication of the quantity of transmission layers scheduled to be used by the at least one neighbor network entity for communication within the communication resource.

Aspect 17: The method of aspect 16, wherein the message includes information indicating an estimated geolocation of a UE served by the first network entity.

Aspect 18: The method of any of aspects 16 through 17, further comprising: identifying the one or more neighbor network entities based on a determination of one or more candidate network entities having a potential to interfere with the first network entity.

Aspect 19: The method of aspect 18, wherein the determination of the one or more candidate network entities is based at least in part on an estimated geolocation of a UE that requests the quantity of transmission layers.

Aspect 20: The method of any of aspects 16 through 19, wherein the first network entity comprises a serving gNodeB (gNB) serving a UE that requests the quantity of transmission layers, the one or more neighbor network entities comprise one or more interferer gNBs, and the second network entity comprises a core network entity serving a plurality of gNBs, the plurality of gNBs comprising the serving gNB and the one or more interferer gNBs.

Aspect 21: A UE for wireless communications, comprising one or more memories storing processor-executable code, and one or more processors coupled with the one or more memories and individually or collectively operable to execute the code to cause the UE to perform a method of any of aspects 1 through 7.

Aspect 22: A UE for wireless communications, comprising at least one means for performing a method of any of aspects 1 through 7.

Aspect 23: A non-transitory computer-readable medium storing code for wireless communications, the code comprising instructions executable by a processor to perform a method of any of aspects 1 through 7.

Aspect 24: A first network entity for wireless communications, comprising one or more memories storing processor-executable code, and one or more processors coupled with the one or more memories and individually or collectively operable to execute the code to cause the first network entity to perform a method of any of aspects 8 through 15.

Aspect 25: A first network entity for wireless communications, comprising at least one means for performing a method of any of aspects 8 through 15.

Aspect 26: A non-transitory computer-readable medium storing code for wireless communications, the code comprising instructions executable by a processor to perform a method of any of aspects 8 through 15.

Aspect 27: A second network entity for wireless communications, comprising one or more memories storing processor-executable code, and one or more processors coupled with the one or more memories and individually or collectively operable to execute the code to cause the second network entity to perform a method of any of aspects 16 through 20.

Aspect 28: A second network entity for wireless communications, comprising at least one means for performing a method of any of aspects 16 through 20.

Aspect 29: A non-transitory computer-readable medium storing code for wireless communications, the code comprising instructions executable by a processor to perform a method of any of aspects 16 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit, to a first network entity serving the UE, a first message comprising a request for a quantity of transmission layers scheduled to be used by one or more neighbor network entities for communication within a communication resource;

receive, from the first network entity, an indication of the quantity of transmission layers for the communication resource; and receive, via the communication resource, a downlink message using a rank-aware channel estimation algorithm corresponding to the quantity of transmission layers for the communication resource.

2. The UE of claim 1, wherein the first message is transmitted based at least in part on noise covariance matrix estimation for the communication resource satisfying an interference threshold value.

3. The UE of claim 2, wherein the one or more processors are individually or collectively further operable to execute the code to cause the UE to:

receive, from the first network entity, control information comprising an indication to perform the noise covariance matrix estimation within the communication resource.

4. The UE of claim 1, wherein:

the first message comprises an indication of a granularity associated with the quantity of transmission layers, and the granularity comprises a quantity of transmission layers per resource element, a quantity of transmission layers per resource block, a quantity of transmission layers per slot, or a quantity of transmission layers per subcarrier.

5. The UE of claim 1, wherein the indication of the quantity of transmission layers comprises a sum of quantities of transmission layers associated with the one or more neighbor network entities.

6. The UE of claim 1, wherein:

the indication of the quantity of transmission layers for the communication resource is received via control signaling, and the control signaling further comprises a scheduling grant that allocates the communication resource to the UE.

7. The UE of claim 1, wherein:

the first message is transmitted via a first medium access control-control element (MAC-CE) or a physical uplink control channel (PUCCH), and the indication of the quantity of transmission layers for the communication resource is received via a second medium access control-control element (MAC-CE) or a physical downlink control channel (PDCCH).

8. A first network entity, comprising:

one or more memories storing processor-executable code; and one or more processors coupled with the one or more memories and individually or collectively operable to execute the code to cause the first network entity to:

receive, from a user equipment (UE) served by the first network entity, a first message comprising a request for a quantity of transmission layers scheduled to be used by one or more neighbor network entities for communication within a communication resource;

transmit, to a second network entity, a second message comprising a request for the quantity of transmission layers for the communication resource;

receive, from the second network entity, a third message comprising an indication of the quantity of transmission layers for the communication resource; and transmit, to the UE, the indication of the quantity of transmission layers for the communication resource.

9. The first network entity of claim 8, wherein:

the first message comprises an indication of a granularity associated with the quantity of transmission layers, and the granularity comprises a quantity of transmission layers per resource element, a quantity of transmission layers per resource block, a quantity of transmission layers per slot, or a quantity of transmission layers per subcarrier.

10. The first network entity of claim 9, wherein the indication of the quantity of transmission layers is based at least in part on the granularity.

11. The first network entity of claim 8, wherein the one or more processors are individually or collectively further operable to execute the code to cause the first network entity to:

transmit, to the UE, control information comprising an indication to perform noise covariance matrix estimation for the communication resource.

12. The first network entity of claim 8, wherein:

the indication of the quantity of transmission layers for the communication resource is transmitted to the UE via control signaling, and the control signaling further comprises a scheduling grant that allocates the communication resource to the UE.

13. The first network entity of claim 8, wherein the first network entity comprises a serving gNodeB (gNB) serving the UE, the one or more neighbor network entities comprise one or more interferer gNBs, and the second network entity comprises a core network entity serving a plurality of gNBs, the plurality of gNBs comprising the serving gNB and the one or more interferer gNBs.

14. The first network entity of claim 8, wherein the first message includes information indicating an estimated geolocation of the UE.

15. The first network entity of claim 8, wherein:

the first message is received via a first medium access control-control element (MAC-CE) or a physical uplink control channel (PUCCH), and the indication of the quantity of transmission layers for the communication resource is transmitted via a second medium access control-control element (MAC-CE) or a physical downlink control channel (PDCCH).

16. A second network entity, comprising:

one or more memories storing processor-executable code; and one or more processors coupled with the one or more memories and individually or collectively operable to execute the code to cause the second network entity to:

receive, from a first network entity, a message comprising a request a quantity of transmission layers scheduled to be used by one or more neighbor network entities for communication within a communication resource;

request, from at least one neighbor network entity of the one or more neighbor network entities, a quantity of transmission layers scheduled to be used by the at least one neighbor network entity for communication within the communication resource; and transmit, to the first network entity, an indication of the quantity of transmission layers scheduled to be used by the at least one neighbor network entity for communication within the communication resource.

17. The second network entity of claim 16, wherein the message includes information indicating an estimated geolocation of a user equipment (UE) served by the first network entity.

18. The second network entity of claim 16, wherein the one or more processors are individually or collectively further operable to execute the code to cause the second network entity to:

identify the one or more neighbor network entities based on a determination of one or more candidate network entities having a potential to interfere with the first network entity.

19. The second network entity of claim 18, wherein the determination of the one or more candidate network entities is based at least in part on an estimated geolocation of a UE that requests the quantity of transmission layers.

20. The second network entity of claim 16, wherein the first network entity comprises a serving gNodeB (gNB) serving a UE that requests the quantity of transmission layers, the one or more neighbor network entities comprise one or more interferer gNBs, and the second network entity comprises a core network entity serving a plurality of gNBs, the plurality of gNBs comprising the serving gNB and the one or more interferer gNBs.

* * * * *